(12) United States Patent
Kim et al.

(10) Patent No.: US 12,527,842 B2
(45) Date of Patent: Jan. 20, 2026

(54) COMPOSITION FOR PREVENTING OR TREATING BONE DISEASES COMPRISING CCR2

(71) Applicant: THE CATHOLIC UNIVERSITY OF KOREA INDUSTRY-ACADEMIC COOPERATION FOUNDATION, Seoul (KR)

(72) Inventors: Seok-Jung Kim, Seoul (KR); Mi-La Cho, Seoul (KR); Hyun-Sik Na, Seoul (KR); Seon-Yeong Lee, Seoul (KR); Si-Yeong Choi, Seoul (KR); Ji-Ye Kwuan, Seoul (KR); Keun-Hyung Cho, Seoul (KR); Goo-Young Kim, Seoul (KR); Seon-Ae Kim, Uijeongbu-si (KR); Eeu-Jeong Go, Gangwon-do (KR); Jeong-Won Choi, Seoul (KR); Jin-Ah Baek, Seoul (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 923 days.

(21) Appl. No.: 17/776,835

(22) PCT Filed: Nov. 15, 2019

(86) PCT No.: PCT/KR2019/015664
§ 371 (c)(1),
(2) Date: May 13, 2022

(87) PCT Pub. No.: WO2021/095946
PCT Pub. Date: May 20, 2021

(65) Prior Publication Data
US 2022/0409698 A1    Dec. 29, 2022

(51) Int. Cl.
| | | |
|---|---|---|
| *A61K 38/17* | (2006.01) |
| *A61K 35/28* | (2015.01) |
| *A61K 38/19* | (2006.01) |
| *A61P 19/02* | (2006.01) |
| *C07K 14/47* | (2006.01) |
| *C07K 14/715* | (2006.01) |
| *C12N 15/63* | (2006.01) |

(52) U.S. Cl.
CPC ............ *A61K 38/195* (2013.01); *A61K 35/28* (2013.01); *A61K 38/1709* (2013.01); *A61K 38/1793* (2013.01); *A61P 19/02* (2018.01); *C07K 14/47* (2013.01); *C07K 14/715* (2013.01); *C12N 15/63* (2013.01)

(58) Field of Classification Search
CPC ............ A61K 38/1793; A61K 38/1709; C07K 14/715; C07K 14/47
See application file for complete search history.

(56) References Cited

U.S. PATENT DOCUMENTS

2006/0182712 A1    8/2006   Penn et al.

FOREIGN PATENT DOCUMENTS

WO    WO-2006109301 A2 *  10/2006  .............. A61P 35/02

OTHER PUBLICATIONS

Izhak et al., J. Immunol., 2009, vol. 183(1): 732-739.*
"C—C chemokine receptor type 2 [Rattus norvegicus]", NCBI Reference Sequence: NP_068638.1, 2018, 3 pages.
Yuan-Kun Xu et al., "The role of MCP-1-CCR2 ligand-receptor axis in chondrocyte degradation and disease progress in knee osteoarthritis", Biological Research, vol. 48, No. 64, 2015, pp. 1-8.
Liat Izhak et al., "A Novel Recombinant Fusion Protein Encoding a 20-Amino Acid Residue of the Third Extracellular (E3) Domain of CCR2 Neutralizes the Biological Activity of CCL2", The Journal of Immunology, vol. 183, No. 1, 2009, pp. 732-739, 9 pages.
International Search Report for PCT/KR2019/015664 dated Aug. 12, 2020.

* cited by examiner

*Primary Examiner* — Xiaozhen Xie
(74) *Attorney, Agent, or Firm* — Sughrue Mion, PLLC

(57) ABSTRACT

The present invention relates to a composition which is for preventing or treating bone diseases and includes CCR2 as an active ingredient. It was confirmed that a C—C chemokine receptor type 2 (CCR2) protein, a polynucleotide encoding the CCR2 protein, or a mesenchymal stem cell transduced with the CCR2 according to the present invention neutralize bone disease factor MCP-1, thereby reducing the collagen epitope (CTX-II) and collagen metabolism factors (MMP1 and MMP3) relating to collagen absorption in the body. In addition, it was confirmed that the expression of the SOX9 gene and anti-inflammatory cytokines (TGF-β and IL-10) related to cartilage differentiation was significantly increased. Thus, the present invention has excellent regenerative ability against osteoarthritis and excellent pain suppression and alleviation effects, and thus can be effectively used for preventing or treating bone diseases such as osteoarthritis.

4 Claims, 18 Drawing Sheets
Specification includes a Sequence Listing.

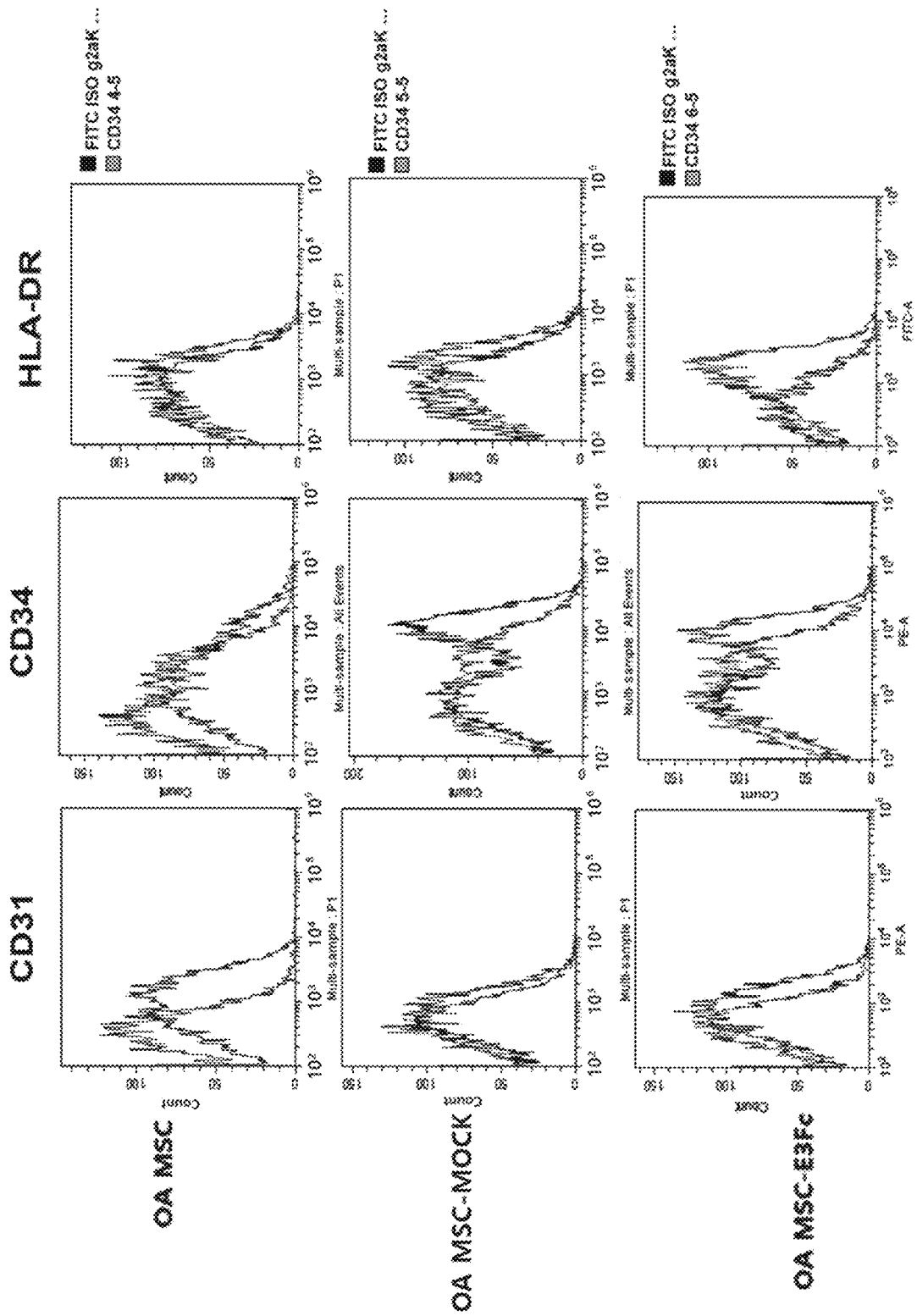

FIG. 14 pSecTag2-rat CCR2

Amio-acid Sequence

METDTLLLWVLLWVPGSTGDAAQPARRARRTKLMEDSNMLPQFIHGILSTSHSL
FPRSIQELDEGATTPYDYDDGEPCHKTSVKQIGAWILPPLYSLVFIFGFVGNMLVI
IILISCKKLKSMTDIYLFNLAISDLLFLLTLPFWAHYAANEWVFGNIMCKLFTGLYH
IGYFGGIFFIILLTIDRYLAIVHAVFALKARTVTFGVITSVVTWVVAVFASLPGIIFT
KSEQEDDQHTCGPYFPTIWKNFQTIMRNILSLILPLLVMVICYSGILHTLFRCRNE
KKRHRAVRLIFAIMIVYFLFWTPYNIVLFLTTFQEFLGMSNCVVDMHLDQAMQV
TETLGMTHCCVNPIIYAFVGEKFRRYLSIFFRKHIAKNLCKQCPVFYRETADRVSS
TFTPSTGEQEVSVGLLQISSTVAAARGGPEQKLISEEDLNSAVDHHHHHH

FIG. 15 pSecTag2-rat CCR2E3-FC

Amio-acid Sequence

METDTLLLWVLLLWVPGSTGDAAQPARRAVRSLTTFQEFLGMSNCV
VDMHLDQALQEPKSCDKTHTCPPCPAPELLGGPSVFLFPPKPKDTLM
ISRTPEVTCVVVDVSHEDPEVKFNWYVDGVEVHNAKTKPREEQYNS
TYRVVSVLTVLHQDWLNGKEYKCKVSNKALPAPIEKTISKAKGQPRE
PQVYTLPPSRDELTKNQVSLTCLVKGFYPSDIAVEWESNGQPENNYK
TTPPVLDSDGSFFLYSKLTVDKSRWQQGNVFSCSVMHEALHNHYTQ
KSLSLSPGKPRGGPEQKLISEEDLNSAVDHHHHHH

FIG. 16 pSecTag2-rat CCR2

Nucleotide Sequence

ATG GAG ACA GAC ACA CTC CTG CTA TGG GTA CTG CTC TGG GTT CCA GGT TCC ACT GGT GAC GCG GCC CAG CCG GCC AGG
CGC GCG CGC CGT ACG AAG CTT ATG GAA GAC AGT AAT ATG TTA CCT CAG TTC ATC CAT GGC ATA CTA TCA ACA TCT CAT TCT
CTA TTT CCA AGA AGT ATC CAA GAG CTT GAT GAG GGG GCC ACC ACA CCG TAT GAC TAT GAT GAT GGT GAA CCT TGT CAT
AAA ACC AGT GTG AAG CAA ATT GGA GCT TGG ATC CTG CCC CCA CTC TAC TCC CTG GTA TTC ATC TTT GGT TTT GTG GGC AAC
ATG TTG GTC ATT ATA ATT CTG ATA AGC TGT AAA AAG CTG AAG AGC ATG ACT GAT ATC TAC CTG TTC AAC CTG GCC ATC TCT
GAC CTG CTC TTC CTG CTC ACA CTC CCA TTC TGG GCT CAC TAT GCT GCA AAT GAG TGG GTC TTT GGG AAT ATA ATG TGC AAA
TTA TTC ACA GGG CTT TAT CAC ATT GGG TAT TTT GGT GGA ATC TTC TTC ATT ATC CTC CTG ACA ATT GAT AGA TAT TTG GCT
ATT GTC CAT GCT GTC TTT GCT TTA AAA GCC AGG ACA GTT ACC TTT GGG GTA ATA ACA AGT GTA GTC ACT TGG GTG GTG GCT
GTG TTT GCC TCT CTA CCA GGA ATC ATA TTT ACT AAA TCT GAA CAA GAA GAT GAT CAG CAT ACT TGT GGC CCT TAT TTT CCA
ACA ATC TGG AAG AAT TTC CAA ACA ATA ATG AGG AAT ATC TTG AGT TTG ATC CTG CCC CTA CTT GTC ATG GTC ATC TGC TAC
TCA GGA ATC CTC CAC ACC CTG TTT CGC TGT AGG AAT GAG AAA AAG AGG CAT AGG GCT GTG AGG CTC ATC TTT GCC ATC
ATG ATT GTC TAC TTT CTC TTC TGG ACT CCA TAC AAT ATT GTT CTC TTC CTG ACC ACC TTC AGG AAT TCT TGG GAA ATG AGT
AAC TGT GTG GTT GAC ATG CAC TTA GAC CAG GCC ATG CAG GTG ACA GAG ACT CTT GGA ATG ACA CAC TGC TGC GTT AAT
CCT ATC ATT TAT GCC TTT GTT GGT GAG AAG TTC CGA AGG TAT CTC TCC ATA TTT TTC AGA AAG CAC ATT GCC AAA AAT CTC
TGC AAA CAA TGC CCA GTT TTC TAT AGG GAG ACA GCA GAC CGA GTG AGC TCA ACA TTT ACC CCT TCT ACT GGG GAG CAA
GAA GTC TCA GTT GGG TTG CTG CAG ATA TCC AGC ACA GTG GCG GCC GCT CGA GGA GGG CCC GAA CAA AAA CTC ATC TCA
GAA GAG GAT CTG AAT AGC GCC GTC GAC CAT CAT CAT CAT CAT CAT TGA

FIG. 17 pSecTag2-rat CCR2

Nucleotide Sequence

ATG GAG ACA GAC ACA CTC CTG CTA TGG GTA CTG CTC TGG GTT CCA GGT TCC ACT GGT GAC GCG GCC CAG CCG GCC AGG
CGC GCG CGC CGT ACG AAG CTT ATG GAA GAC AGT AAT ATG TTA CCT CAG TTC ATC CAT GGC ATA CTA TCA ACA TCT CAT TCT
CTA TTT CCA AGA AGT ATC CAA GAG CTT GAT GAG GGG GCC ACC ACA CCG TAT GAC TAT GAT GAT GGT GAA CCT TGT CAT
AAA ACC AGT GTG AAG CAA ATT GGA GCT TGG ATC CTG CCC CCA CTC TAC TCC CTG GTA TTC ATC TTT GGT TTT GTG GGC AAC
ATG TTG GTC ATT ATA ATT CTG ATA AGC TGT AAA AAG CTG AAG AGC ATG ACT GAT ATC TAC CTG TTC AAC CTG GCC ATC TCT
GAC CTG CTC TTC CTG CTC ACA CTC CCA TTC TGG GCT CAC TAT GCT GCA AAT GAG TGG GTC TTT GGG AAT ATA ATG TGC AAA
TTA TTC ACA GGG CTT TAT CAC ATT GGG TAT TTT GGT GGA ATC TTC TTC ATT ATC CTC CTG ACA ATT GAT AGA TAT TTG GCT
ATT GTC CAT GCT GTC TTT GCT TTA AAA GCC AGG ACA GTT ACC TTT GGG GTA ATA ACA AGT GTA GTC ACT TGG GTG GTG GCT
GTG TTT GCC TCT CTA CCA GGA ATC ATA TTT ACT AAA TCT GAA CAA GAA GAT GAT CAG CAT ACT TGT GGC CCT TAT TTT CCA
ACA ATC TGG AAG AAT TTC AAA ACA ATA ATG AGG AAT ATC TTG AGT TTG ATC CTG CCC CTA CTT GTC ATG GTC ATC TGC TAC
TCA GGA ATC CTC CAC ACC CTG TTT CGC TGT AGG AAT GAG AAA AAG AGG CAT AGG GCT GTG AGG CTC ATC TTT GCC ATC
ATG ATT GTC TAC TTT CTC TTC TGG ACT CCA TAC AAT ATT GTT CTC TTC CTG ACC ACC TTC AGG GAA TTC TTG GGA ATG AGT
AAC TGT GTG GTT GAC ATG CAC TTA GAC CAG GCC ATG CAG GTG ACA GAG ACT CTT GGA ATG ACA CAC TGC TGC GTT AAT
CCT ATC ATT TAT GCC TTT GTT GGT GAG AAG TTC CGA AGG TAT CTC TCC ATA TTT TTC AGA AAG CAC ATT GCC AAA AAT CTC
TGC AAA CAA TGC CCA GTT TTC TAT AGG GAG ACA GCA GAC CGA GTG AGC TCA ACA TTT ACC CCT TCT ACT GGG GAG CAA
GAA GTC TCA GTT GGG TTG CTG CAG ATA TCC AGC ACA GTG GCG GCC GCT CGA GGA GGG CCC GAA CAA AAA CTC ATC TCA
GAA GAG GAT CTG AAT AGC GCC GTC GAC CAT CAT CAT CAT CAT CAT TGA

FIG. 18

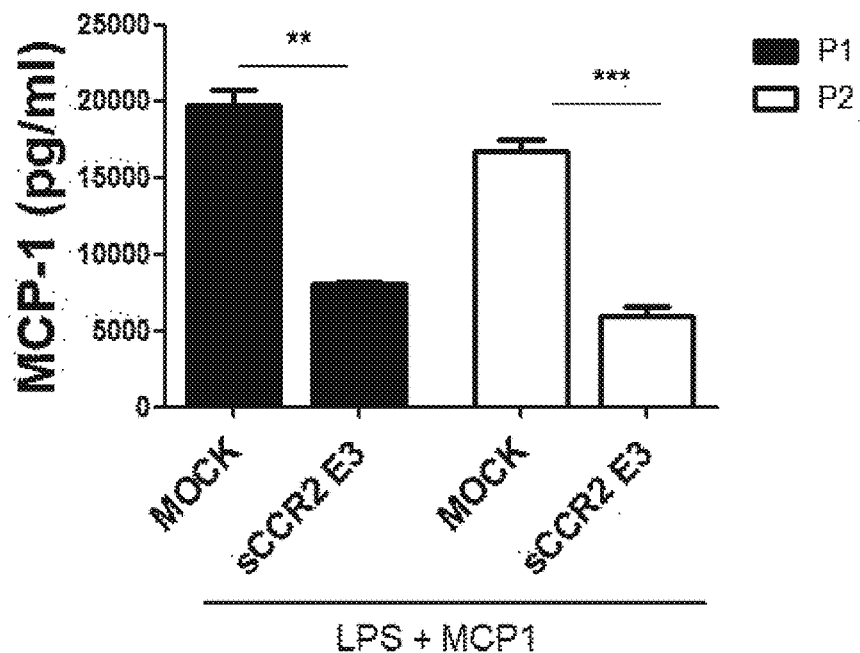

COMPOSITION FOR PREVENTING OR TREATING BONE DISEASES COMPRISING CCR2

CROSS REFERENCE TO RELATED APPLICATIONS

This application is a National Stage of International Application No. PCT/KR2019/015664 filed Nov. 15, 2019.

TECHNICAL FIELD

The present invention relates to a composition for preventing or treating bone diseases including CCR2 as an active ingredient.

BACKGROUND ART

Osteoarthritis (OA) is a degenerative joint disease that frequently occurs in cartilage and is a geriatric disease commonly seen in clinical practice according to the aging of the population, in which the lesion starts based on degenerative changes in the articular cartilage, causing pain and swelling during exercise, joint stiffness, and gradual movement disorders.

For the treatment of osteoarthritis, exercise therapy such as weight loss, muscle strengthening exercises, simple analgesics, non-steroidal anti-inflammatory drugs, intra-articular steroid injections and surgery, drug therapy, and surgery are implemented. However, steroid anti-inflammatory drugs can cause complications such as gastrointestinal disorders, and other intra-articular injection therapies of steroids have systemic side effects and risk of cartilage destruction and infection due to repeated injections of steroids, and thus they cannot be an active treatment. In addition, there is a lack of treatment for osteoarthritis that can essentially inhibit or block the progression of degenerative diseases.

DISCLOSURE

Technical Problem

An object of the present invention is to provide a pharmaceutical composition for preventing or treating bone diseases, in which the composition includes C—C chemokine receptor type 2 (CCR2) protein or a polynucleotide encoding the CCR2 protein as an active ingredient.

Another object of the present invention is to provide a cell therapy composition for preventing or treating bone diseases, in which the composition includes mesenchymal stem cells transduced with a recombinant vector containing C—C chemokine receptor type 2 (CCR2) or a culture solution thereof as an active ingredient.

Still another object of the present invention is to provide a recombinant peptide in which the E3 domain of C—C chemokine receptor type 2 (CCR2) and an Fc fragment are fused.

Yet another object of the present invention is to provide a recombinant vector including a polynucleotide encoding the recombinant peptide.

Technical Solution

In order to achieve the above object, the present invention provides a pharmaceutical composition for preventing or treating bone diseases, in which the composition includes C—C chemokine receptor type 2 (CCR2) protein or a polynucleotide encoding the CCR2 protein as an active ingredient.

In one embodiment of the present invention, the CCR2 protein may include the amino acid sequence represented by SEQ ID NO: 1.

In one embodiment of the present invention, the CCR2 protein may include the amino acid sequence represented by SEQ ID NO: 3 as the E3 domain of the CCR2 protein.

In one embodiment of the present invention, the polynucleotide encoding the CCR2 protein may include the nucleotide sequence represented by SEQ ID NO: 2.

In one embodiment of the present invention, the polynucleotide encoding the CCR2 protein may include the nucleotide sequence represented by SEQ ID NO: 4, which is a polynucleotide encoding the E3 domain of the CCR2 protein.

In one embodiment of the present invention, the polynucleotide may be included in the expression vector.

In one embodiment of the present invention, the bone disease may be osteoarthritis.

Further, the present invention provides a cell therapy composition for preventing or treating bone diseases, the composition including mesenchymal stem cells transduced with a recombinant vector containing C—C chemokine receptor type 2 (CCR2) or a culture solution thereof as an active ingredient.

In one embodiment of the present invention, the CCR2 may include the amino acid sequence represented by SEQ ID NO: 2 or SEQ ID NO: 4.

In one embodiment of the present invention, the mesenchymal stem cells may be isolated from the peripheral blood or adipose tissue of an osteoarthritis patient.

In one embodiment of the present invention, the bone disease may be osteoarthritis.

Further, the present invention provides a recombinant peptide in which the E3 domain of C—C chemokine receptor type 2 (CCR2) and an Fc fragment are fused.

In one embodiment of the present invention, the recombinant peptide may include the amino acid sequence represented by SEQ ID NO: 5.

Further, the present invention provides a recombinant vector including a polynucleotide encoding the recombinant peptide.

In one embodiment of the present invention, the polynucleotide may include the nucleotide sequence represented by SEQ ID NO: 6.

Further, the present invention provides a pharmaceutical composition for preventing or treating bone diseases, in which the composition includes the recombinant peptide as an active ingredient.

Further, the present invention provides a cell therapy composition for preventing or treating bone diseases, in which the composition includes mesenchymal stem cells transduced with the recombinant vector or a culture solution thereof as an active ingredient.

Advantageous Effects

It was confirmed that the C—C chemokine receptor type 2 (CCR2) protein, the polynucleotide encoding CCR2 protein, or the mesenchymal stem cells transduced with CCR2 according to the present invention neutralize MCP-1, a bone disease factor, thereby reducing a collagen epitope (CTX-II) related to collagen absorption into the body and collagen metabolic factors (MMP1 and MMP3). Further, it was confirmed that they significantly increased the expression of SOX9 gene related to cartilage differentiation and anti-inflammatory cytokines (TGF-β and IL-10). Therefore, it has the excellent regenerative ability for osteoarthritis and excellent pain suppression and alleviation effects, and thus can be usefully used for the prevention or treatment of bone diseases such as osteoarthritis.

DESCRIPTION OF DRAWINGS

FIG. 12A and FIG. 12B show the results of analyzing the characteristics of mesenchymal stem cells expressing sCCR2, in which FIG. 12A shows the results of analyzing a positive marker, and FIG. 12B shows the results of analyzing a negative marker.

FIG. 14 shows the amino acid sequence of pSecTag2-rat CCR2 (SEQ ID NO: 7).

FIG. 15 shows the amino acid sequence of pSecTag2-rat CCR2E3-FC (SEQ ID NO: 8).

FIG. 16 shows the nucleotide sequence of pSecTag2-rat CCR2 (SEQ ID NO: 9).

FIG. 17 shows the nucleotide sequence of pSecTag2-rat CCR2E3-FC (SEQ ID NO: 10).

FIG. 18 shows MCP-1 neutralization after injection of mesenchymal stem cells expressing sCCR2 (E3-Fc) into the osteoarthritis-animal model.

BEST MODE

Figure 1A:
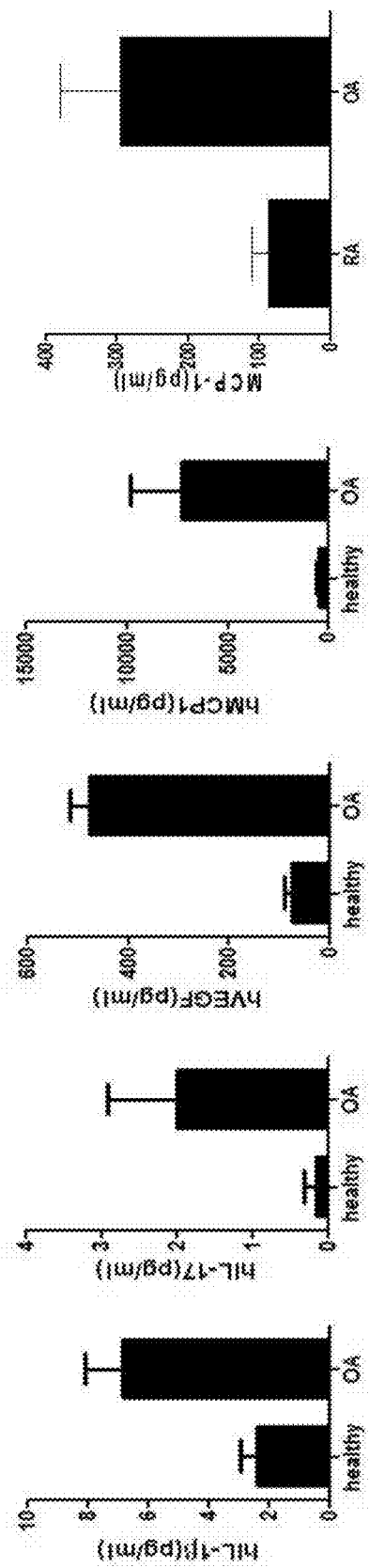
FIG. 1A shows the results of measuring the secretion amount of inflammatory cytokines including human IL-1β, human IL-17, human VEGF, human MCP1, etc. in the synovial fluid of a healthy person or osteoarthritis (OA) patient (from the left), and the results of comparing the secretion amount for MCP1 among them in rheumatoid arthritis patient or osteoarthritis patient (far right).

Hereinafter, as used herein, the term "C—C chemokine receptor type 2 (CCR2)" is a chemokine receptor, a protein encoded by the CCR2 gene, and a receptor of monocyte chemoattractant protein-1 or CCL2 (MCP1) that attracts monocytes.

The present invention may provide the composition for preventing or treating bone diseases, in which the composition includes a stem cell transduced with a recombinant vector containing C—C chemokine receptor type 2 (CCR2) or a culture solution thereof as an active ingredient.

Further, the present invention may provide a composition for preventing or treating bone diseases, in which the composition includes a stem cell transduced with a recombinant vector including the E3 domain of C—C chemokine receptor type 2 (CCR2) or a culture solution thereof as an active ingredient.

Preferably, the CCR2 protein may include the amino acid sequence represented by SEQ ID NO: 1, or may include the amino acid sequence represented by SEQ ID NO: 3 as the E3 domain of the CCR2 protein. The polynucleotide encoding the CCR2 protein may include the nucleotide sequence represented by SEQ ID NO: 2, or may include the nucleotide sequence represented by SEQ ID NO: 4 as a polynucleotide encoding the E3 domain of the CCR2 protein.

Further, the CCR2 protein according to the present invention may preferably be a functional equivalent to a polypeptide including the amino acid sequence represented by SEQ ID NO: 1. The "functional equivalent" means having at least 60%, preferably at least 70%, and more preferably at least 80% sequence homology with the amino acid sequence represented by SEQ ID NO: 1 as a result of addition, substitution, or deletion of amino acids, and it refers to a polypeptide that exhibits substantially homogeneous activity as CCR2 of the present invention. The "substantially homogeneous activity" refers to the activity of CCR2. The functional equivalent may include, for example, an amino acid sequence variant in which some of the amino acids of the amino acid sequence of CCR2 according to the present invention are substituted, deleted, or added. The substitution of amino acids may preferably be conservative substitutions, and examples of conservative substitutions of naturally occurring amino acids are as follows: aliphatic amino acids (Gly, Ala, Pro), hydrophobic amino acids (Ile, Leu, Val), aromatic amino acids (Phe, Tyr, Trp), acidic amino acids (Asp, Glu), basic amino acids (His, Lys, Arg, Gln, Asn) and sulfur-containing amino acids (Cys, Met). Deletion of amino acids may preferably occur in a portion not directly involved in the activity of CCR2 of the present invention. Further, the scope of the functional equivalent may include a polypeptide derivative in which some chemical structures of the polypeptide are modified while maintaining the basic backbone of CCR2 and its physiological activity. For example, fusion proteins made by fusion with other proteins while maintaining structural changes and physiological activity to change the stability, storage, volatility, or solubility of the polypeptide of the present invention may be included therein.

Further, the polynucleotide encoding the CCR2 protein may be introduced into an expression vector such as a plasmid or a viral vector by a known method, and then the expression vector may be transduced or transfected into the target cell as an expression type by various methods known in the art.

Plasmid expression vectors can be used in FDA-approved gene delivery methods for humans, which is a method of directly delivering plasmid DNA into human cells (Nabel, E G et al, Science, 249:1285-1288, 1990). The plasmid DNA has the advantage that it may be purified homogeneously, unlike a viral vector. As a plasmid expression vector that can be used in the present invention, mammalian expression plasmids known in the art may be used. In one embodiment of the present invention, pSecTag2A-CCR2 and pSecTag2A-CCR2E3 vectors are prepared, which are recombinant expression vectors into which the CCR2 gene is inserted into pSecTag2A vector.

The plasmid expression vector containing the nucleic acid according to the present invention may be introduced into the target cell by methods known in the art, for example, transient transfection, microinjection, transduction, cell fusion, calcium phosphate precipitation, liposome-mediated transfection, DEAE Dextran-mediated transfection, polybrene-mediated transfection, electroporation, gene gun, and other known methods for introducing DNA into the cell, but is not limited thereto (Wu et al, J Bio Chem, 267:963-967, 1992; Wu et al, Bio Chem, 263:14621-14624, 1988).

In addition, the vector capable of expressing CCR2 may be administered to cells, tissues, or the body by a known method; for example, may be administered topically, parenterally, orally, nasally, intravenously, intramuscularly, subcutaneously, or by other suitable means. In particular, the vector may be directly injected in an amount effective to treat a target tissue or target cell.

The composition according to the present invention may be used as a pharmaceutical composition capable of preventing and treating bone diseases, preferably osteoarthritis, and the pharmaceutical composition may further include a pharmaceutically acceptable carrier.

The expression "pharmaceutically acceptable" means that the composition is physiologically acceptable and does not cause allergic reactions or similar reactions such as gastrointestinal disorders, dizziness, and the like when administered to a human. Pharmaceutically acceptable carriers include, for example, carriers for oral administration such as lactose, starch, cellulose derivatives, magnesium stearate, and stearic acid and carriers for parenteral administration such as water, suitable oils, saline, aqueous glucose and glycols, and may further include a stabilizer and a preservative. Suitable stabilizers include antioxidants such as sodium bisulfite, sodium sulfite, and ascorbic acid. Suitable preservatives include benzalkonium chloride, methyl- or propyl-paraben and chlorobutanol. As other pharmaceutically acceptable carriers, reference may be made to those described in the following literature (Remington's Pharmaceutical Sciences, 19th ed, Mack Publishing Company, Easton, PA, 1995). The pharmaceutical composition according to the present invention may be formulated in a suitable form according to a method known in the art together with a pharmaceutically acceptable carrier as described above. That is, the pharmaceutical composition of the present invention may be prepared in various parenteral or oral dosage forms according to known methods, and as a representative dosage form for parenteral administration, an isotonic aqueous solution or suspension is preferred as an injectable dosage form. Formulations for injection may be prepared according to techniques known in the art using suitable dispersing agents, wetting agents, or suspending agents. For example, each component may be formulated for injection by dissolving it in saline or buffer. Further, formulations for oral administration include, but are not limited to, powders, granules, tablets, pills, capsules, and the like.

The pharmaceutical composition formulated in the above manner may be administered in an effective amount through various routes including oral, transdermal, subcutaneous, intravenous, or intramuscular administration. As used herein, the term "effective amount" refers to an amount exhibiting a preventive or therapeutic effect when administered to a patient. The dosage of the pharmaceutical composition according to the present invention may be appropriately selected according to the administration route, administration target, age, sex, weight, individual differences, and disease state. Preferably, the pharmaceutical composition of the present invention may vary the content of the active ingredient depending on the severity of the disease, but may be administered repeatedly several times a day at an effective dose of preferably 0.1 to 1000 mg/weight kg/day. In addition, the composition of the present invention may be administered in combination with a known compound having an effect of preventing, alleviating or treating bone diseases.

Further, the present invention provides a method for preventing or treating bone diseases, the method including a step of administering a pharmaceutical composition for preventing or treating bone diseases, including a pharmaceutically effective amount of a C—C chemokine receptor type 2 (CCR2) protein or a polynucleotide encoding the CCR2 protein as an active ingredient to an individual.

Further, the present invention provides a method for preventing or treating bone diseases, the method including a step of administering a cell therapy composition for preventing or treating bone diseases, including mesenchymal stem cells transduced with a recombinant vector containing a pharmaceutically effective amount of C—C chemokine receptor type 2 (CCR2) or a culture solution thereof as an active ingredient to an individual.

Further, the present invention provides a method for preventing or treating bone diseases, the method including a step of administering a pharmaceutically effective amount of a recombinant peptide in which the E3 domain of C—C chemokine receptor type 2 (CCR2) and an Fc fragment are fused, and a recombinant vector including a polynucleotide encoding the same to an individual.

The pharmaceutical composition of the present invention is administered in a therapeutically effective amount or a pharmaceutically effective amount. The term "pharmaceutically effective amount" means an amount sufficient to treat a disease with a reasonable benefit/risk ratio applicable to medical treatment, and the effective dose level may depend on the subject type, severity, age, sex, activity of the drug, the drug sensitivity, administration time, administration route, excretion rate, treatment duration, factors including concurrent drugs, and other factors well known in the medical field.

Modes of the Invention

Hereinafter, the present invention is described in more detail through examples. These examples are for explaining the present invention in more detail, and the scope of the present invention is not limited to these examples.

Example 1. Identification of the Correlation Between Increased Expression of MCP1 and Etiologic Response in Osteoarthritis Patients In order to identify the etiology of osteoarthritis, the present inventors performed an experiment in which the secretion amounts of various types of inflammatory cytokines are compared in the synovial fluid of a healthy person or osteoarthritis (OA) patient. The measurement of the secretion amount was carried out through a known method, ELIZA.

As a result, it was confirmed that the secretion of human IL-1β, human IL-17, human vascular endothelial growth factor (VEGF), and human monocyte chemoattractant protein 1 (MCP-1) from the synovial fluid of osteoarthritis patients was significantly increased compared to healthy people. (FIG. 1A). In particular, the present inventors confirmed the amount of MCP-1 secretion in rheumatoid arthritis patients and osteoarthritis patients, and as a result, it was confirmed that the MCP-1 secretion amount in the synovial fluid of osteoarthritis patients was significantly increased compared to rheumatoid arthritis patients (right graph in FIG. 1A).

Then, the present inventors performed an experiment to determine whether there is a change in the expression level of the gene after treating the patient-derived chondrocytes with MCP-1. The above experiment was performed by a known RT-PCR, and the primer sequences are as follows.

TABLE 1

| Gene | Orientation | Sequence |
|---|---|---|
| collagen 2a | forward | 5'-TCT ACC CCA ATC CAG CAA AC-3' |
|  | reverse | 5'-GTT GGG AGC CAG ATT GTC AT-3' |
| SOX9 | forward | 5'-ACT TGC ACA ACG CCG AG-3' |
|  | reverse | 5'-CTG GTA CTT GTA ATC CGG GTG-3' |
| MMP1 | forward | 5'-AGT CCA AGA GAA TGG CCG AG-3' |
|  | reverse | 5'-GCA GCG TCA AGT TTA ACT GGA A-3' |
| MMP3 | forward | 5'-CTC ACA GAC CTG ACT CGG TT-3' |
|  | reverse | 5'-CAC GCC TGA AGG AAG AGA TG-3' |
| TRPV2 | forward | 5'-AGT CAA CCT CAA CTA CCG AAA GG-3' |
|  | reverse | 5'-CCG CAT TGA AGA GCC GAT CT-3' |

Figure 1B:
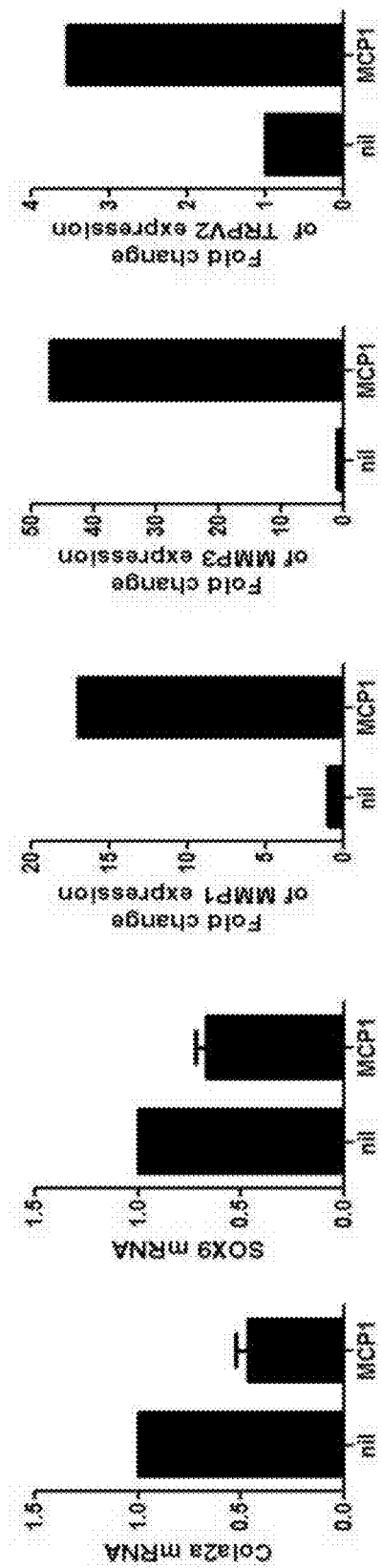
FIG. 1B shows the comparison results of the mRNA expression levels of collagen type 2a and SOX9 related to the differentiation of chondrocytes, the expression levels of MMP1 and MMP3, the catalytic enzymes, and the expression levels of TRPV2, a pain factor after treating patient-derived chondrocytes with MCP1.

As a result, it was confirmed that the mRNA expression levels of collagen type 2a and SOX9 genes related to the differentiation of chondrocytes were decreased, and the mRNA gene expression levels of matrix metalloproteinase 1 (MMP1) and matrix metalloproteinase 3 (MMP3), known as collagenases, were significantly increased. (FIG. 1B). Further, it was confirmed that the mRNA expression level of transient receptor potential cation channel subfamily V member 2 (TRPV2), known as a pain activator, was also increased (FIG. 1B).

Figure 2:
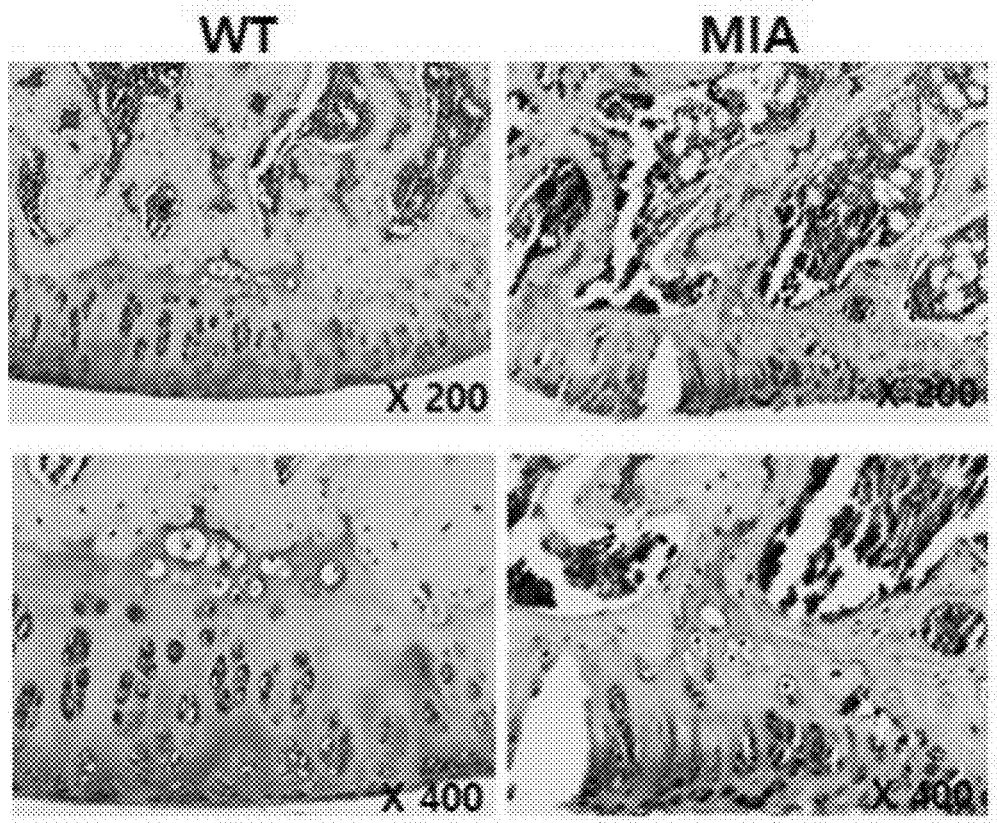
FIG. 2 shows the results of confirming the expression of MCP1 in the cartilage tissue of an animal model of osteoarthritis through immunochemical staining.

In addition, the present inventors performed an experiment to determine whether MCP1 is expressed after isolating the cartilage tissue of the animal model of osteoarthritis. The experiment was performed through a known immunochemical staining method. As a result, it was confirmed that the expression of MCP1 was significantly increased in the osteoarthritis animal model compared to the normal control group (FIG. 2).

Therefore, the present inventors confirmed that MCP1 is a major factor that can cause osteoarthritis when the expression or secretion amount of MCP1 is increased.

Figure 3:
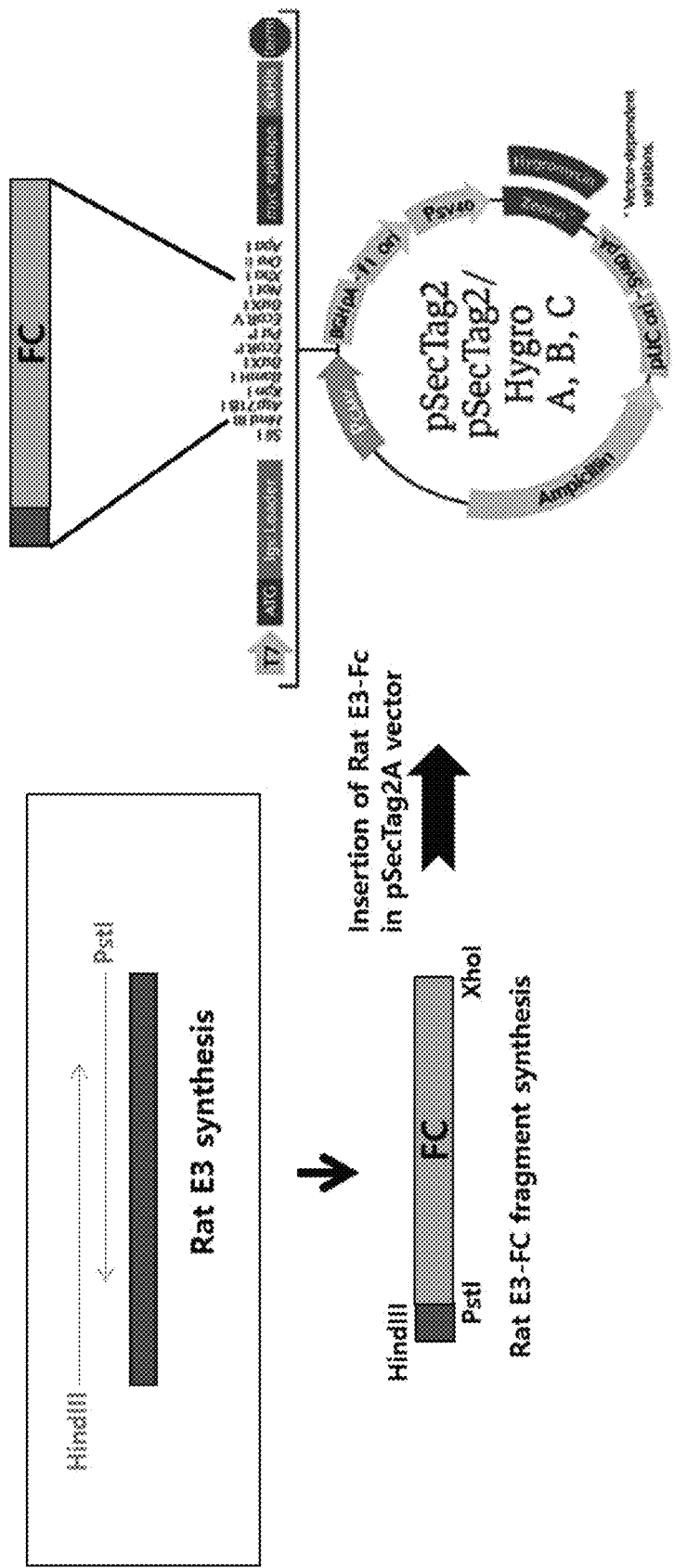
FIG. 3 shows a map of a recombinant vector overexpressing sCCR2 E3-Fc according to an embodiment of the present invention.
Figure 4:
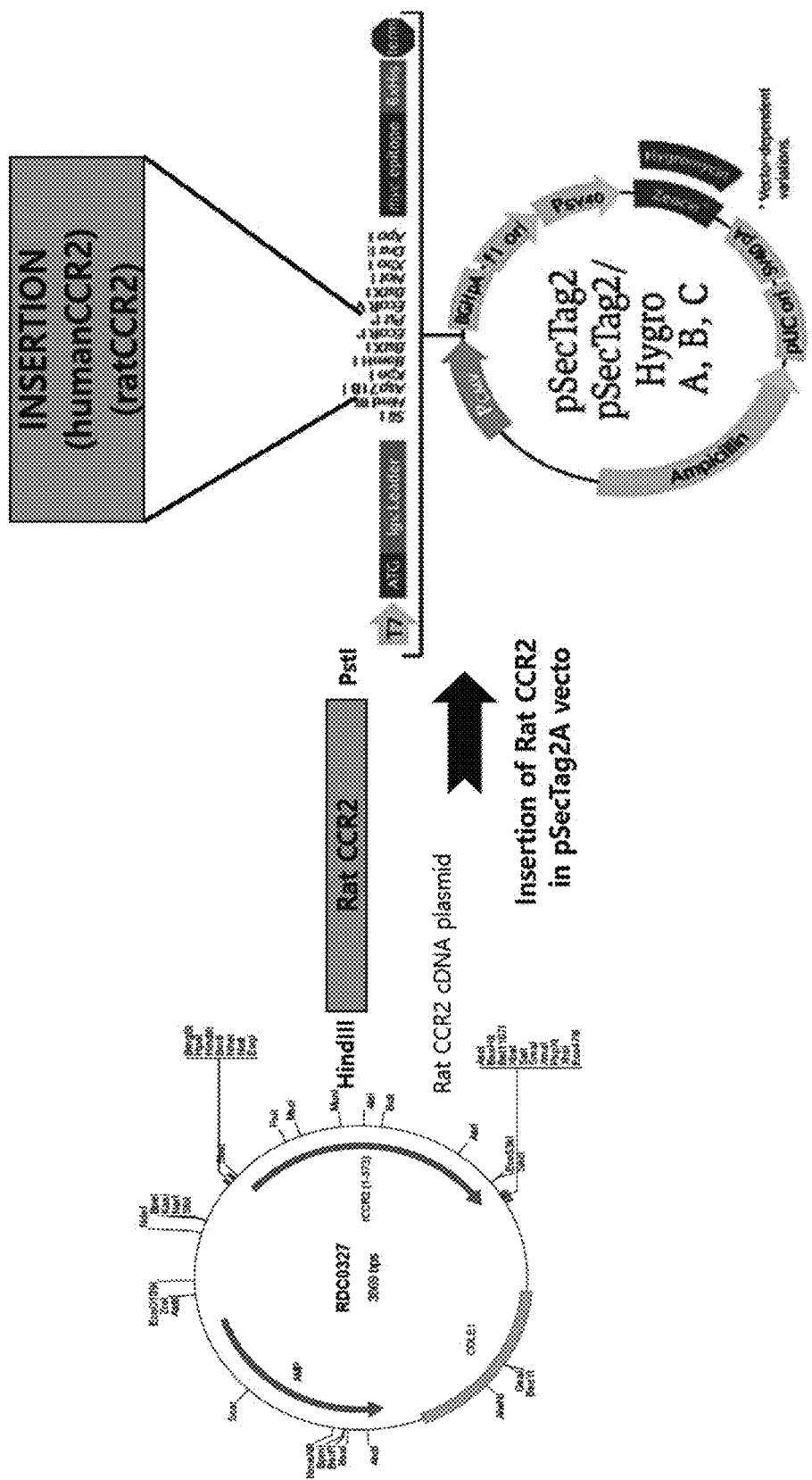
FIG. 4 shows a map of a recombinant vector overexpressing sCCR2 according to an embodiment of the present invention.

Example 2. Construction of Recombinant Vector Overexpressing Rat sCCR2 (Soluble C—C Chemokine Receptor Type 2) and Confirmation of sCCR2 Overexpression The present inventors used PCR to synthesize a complex sequence linking the C—C chemokine receptor type 2 (CCR2) known as a receptor for MCP1 or the E3 domain known as the binding site of MCP1 among the sequences of CCR2 with the Fc fragment. Thereafter, the CCR2 or E3-Fc was inserted into the pSecTag2A vector using a restriction enzyme to prepare a recombinant vector. A recombinant vector capable of expressing CCR2 or E3-Fc has the cleavage map of FIG. 3 or FIG. 4. Specific sequence information of the recombinant vector into which CCR2 is inserted is shown in FIGS. 14 and 16, and specific sequence information of the recombinant vector into which E3-Fc is inserted is shown in FIGS. 15 and 17.

Figure 5:
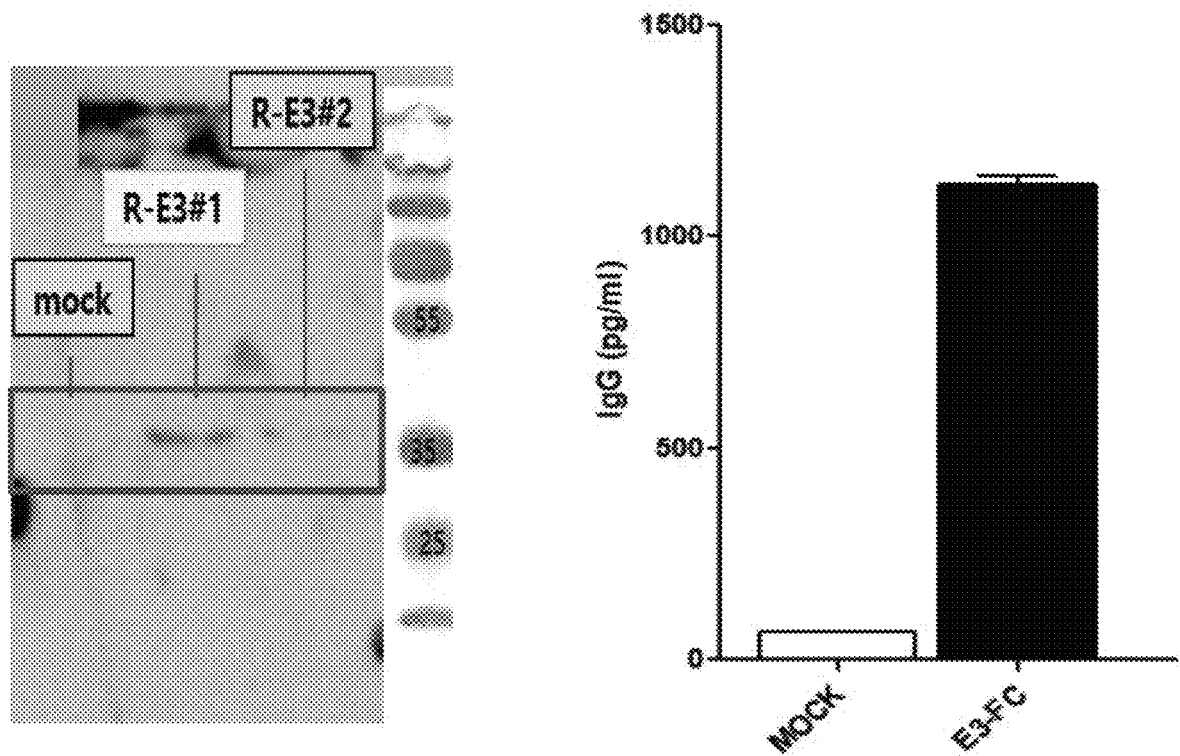
FIG. 5 shows the results of confirming whether or not overexpression of HEK293 cells introduced with sCCR2 recombinant vector.

Thereafter, the present inventors introduced the prepared recombinant vector into HEK293 cells and performed an experiment to confirm whether the sCCR2 protein is expressed. The experiment was performed through known Western blotting. As a result, the expression of sCCR2 was confirmed in R-E3 #1 (pSecTag2A-rat CCR2E3 #1 construct) (FIG. 5).

Example 3. Recovery of Cartilage Damage by Recombinant Vector Overexpressing sCCR2 (E3-Fc)

In order to confirm the recovery of cartilage damage within the cartilage of the osteoarthritis-animal model, the present inventors collected rat femurs and analyzed the degree of cartilage damage using a dissecting microscope and Safranin O staining method.

Figure 6:
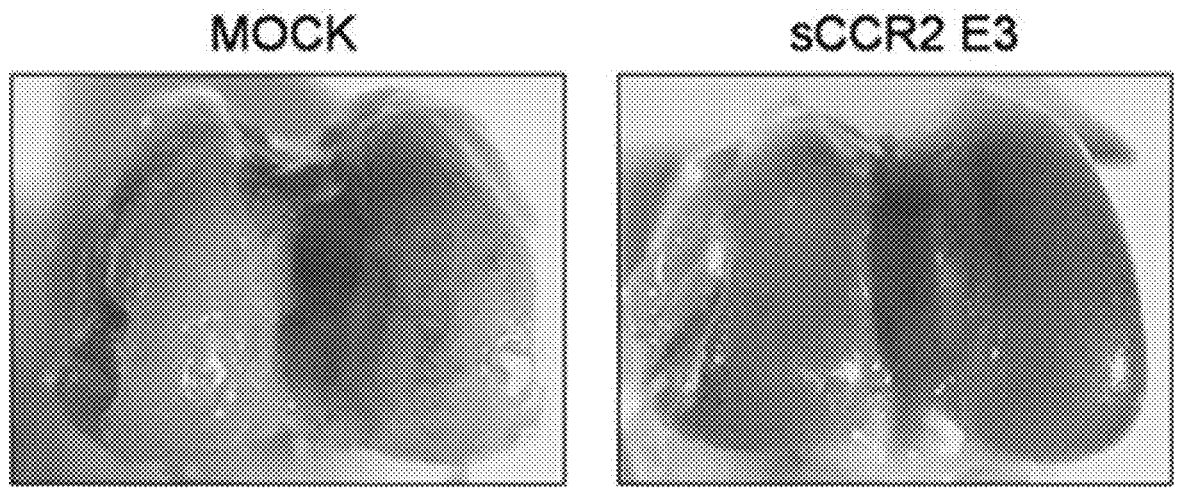
FIG. 6 is an observation under a dissecting microscope of the recovered femoral joint after injecting the recombinant vector overexpressing sCCR2 (E3-Fc) into the osteoarthritis-animal model.
Figure 7:
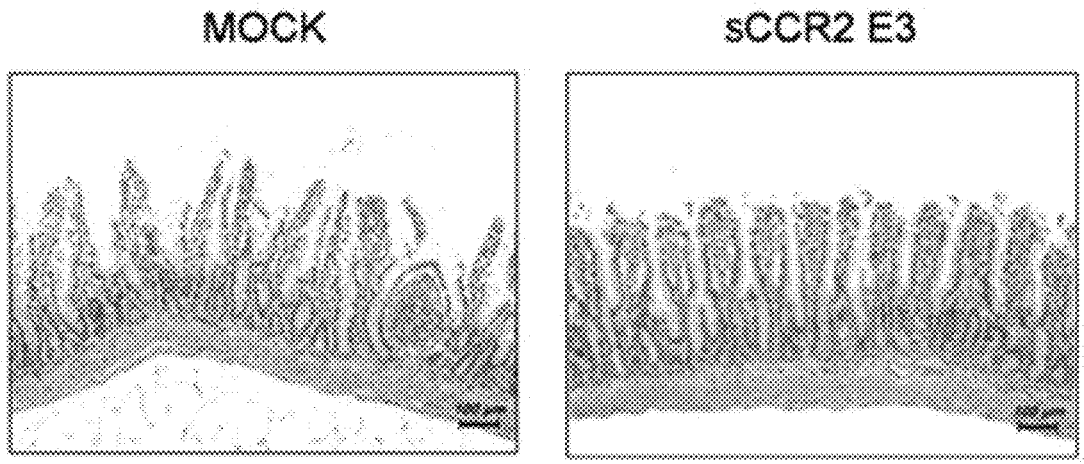
FIG. 7 shows the results of confirming the damaged cartilage and the recovered cartilage by Safranin O staining after injecting the recombinant vector overexpressing sCCR2 (E3-Fc) into the osteoarthritis-animal model.

As a result, it was confirmed that cartilage damage was recovered in the sCCR2 (E3-Fc)-treated group compared to the control group (Mock) (FIGS. 6 and 7).

Example 4. Therapeutic Effect on Osteoarthritis by sCCR2 Overexpression 4.1. Osteoarthritis Animal Model The present inventors tested the pain relief effect on osteoarthritis in the osteoarthritis animal model in order to confirm whether overexpression of sCCR2 is effective in the treatment of osteoarthritis.

Specifically, in order to prepare an osteoarthritis animal model, 5-week-old male Wistar rats weighing 200 to 250 g were bred at a temperature of 21 to 22° C. in a light-dark cycle at 12-hour intervals. They were raised by supplying sterile water and feed. Then, for osteoarthritis induction, monosodium iodoacetate (MIA) (Sigma, ST. Louis, MO) dissolved in physiological saline at a dose of 3 mg/50 μl was administered to the right knee of a rat to induce osteoarthritis.

4.2. Pain Analysis

After MIA administration, the recombinant vector prepared in Example 2 was injected using an intra-articular injection in an osteoarthritis animal model, and then the joint cavity was stimulated 5 times with 80 mV using an electroporator to increase cell membrane permeability. After 4 days, 7 days, 11 days, and 13 days of MIA administration, the degree of pain, which is an index to evaluate the effect on the behavior of the osteoarthritis-induced animals, was measured.

Specifically, the pain was measured using a Dynamic Plantar Aesthsiometer (Ugo Basile, Comerio, Italy), and the pain was measured by the machine in which a mesh plate was placed on the measuring machine, a rat was placed in an acrylic animal holder on it, and then the right foot, where the drug was injected, was stabbed with a measuring machine. The time it takes to release the foot after being stabbed (Paw Withdrawal Latency, seconds) and how much weight it takes to release the foot (Paw Withdrawal Threshold, g) were measured, and the time and weight were recorded to draw a pain measurement graph, and the weight of the right hind leg was also measured.

Figure 8:
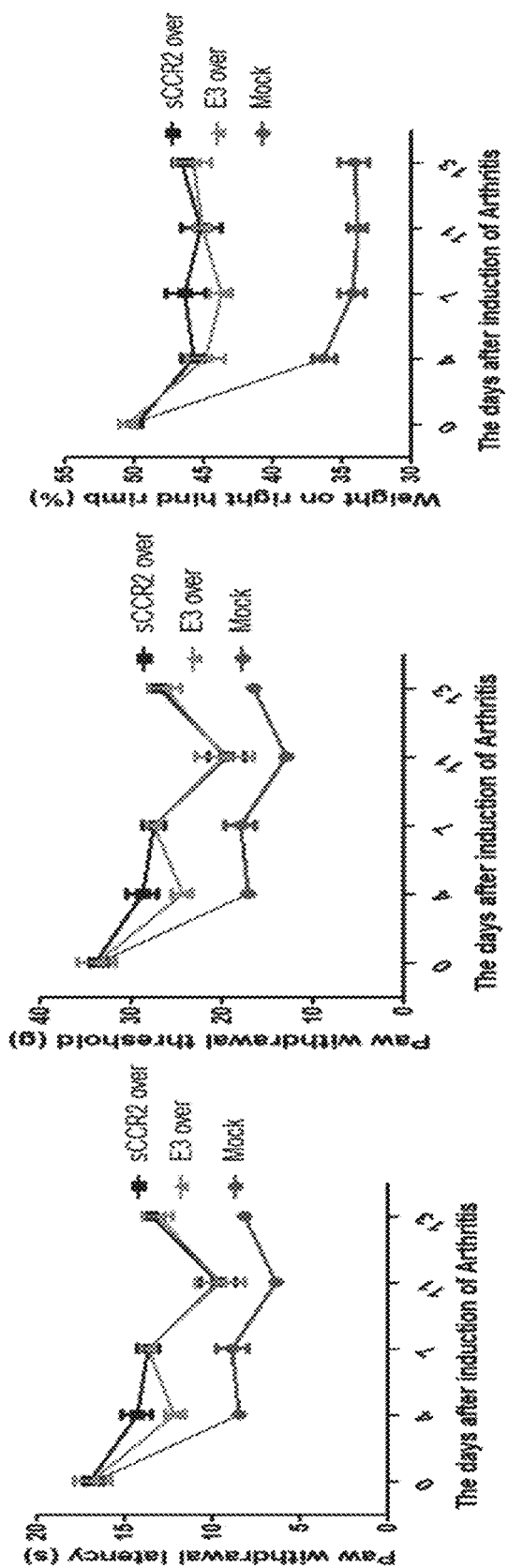
FIG. 8 shows the results of paw withdrawal latency (seconds), paw withdrawal threshold (g), and weight measurement of the right hind limb after injecting the sCCR2 recombinant vector in the osteoarthritis-animal model.

As a result, it was confirmed that when sCCR2 or E3-Fc recombinant vector was injected into osteoarthritis rats, the degree of pain response was almost close to that of normal rats compared to the control group (Mock) (FIG. 8). In addition, it was confirmed that the weight of the right hind limb was significantly reduced in the control group (Mock), but the weight of the group treated with sCCR2 or E3-Fc recombinant vector was maintained similar to that of the normal (FIG. 8).

4.3. Analysis of Degree of Cartilage Damage

The present inventors collected rat femur and tibia and analyzed the degree of cartilage damage by the Safranin 0 staining method. In addition, the degree of cartilage damage through Safranin 0 staining was compared with the OARSI score and Mankin score.

Figure 9:
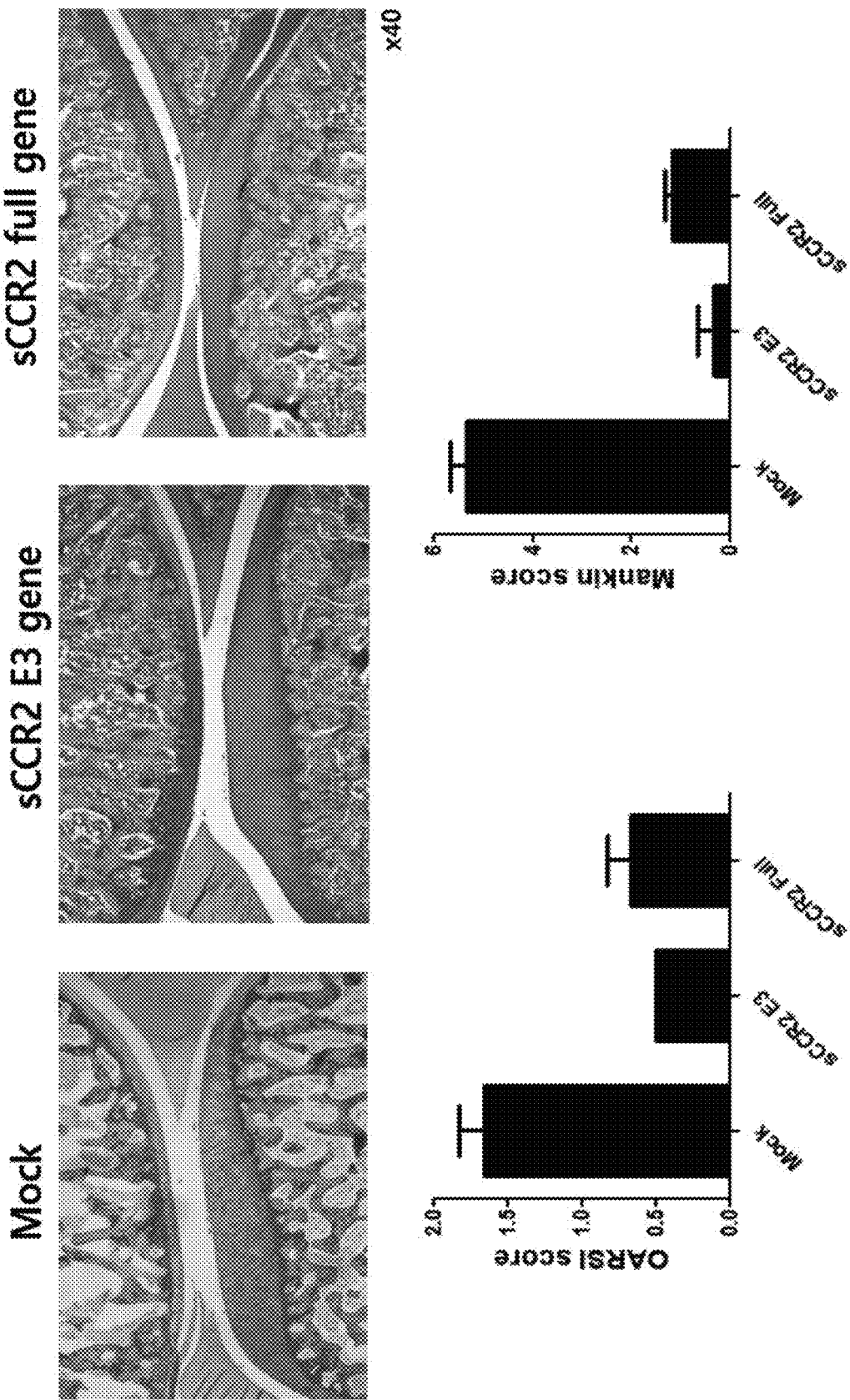
FIG. 9 shows a comparison of the degree of cartilage damage after Safranin O staining of the joint site of the osteoarthritis-animal model and shows the results of OARSI score and Mankin score.

As a result, it was confirmed that the cartilage of the group treated with the sCCR2 or E3-Fc recombinant vector was not damaged compared to the control group (Mock), and the OARSI score (cartilage-specific analysis) and Mankin score (comprehensive analysis of cartilage and inflammatory infiltration) score were low (FIG. 9).

4.4. Micro CT Analysis

Figure 10:
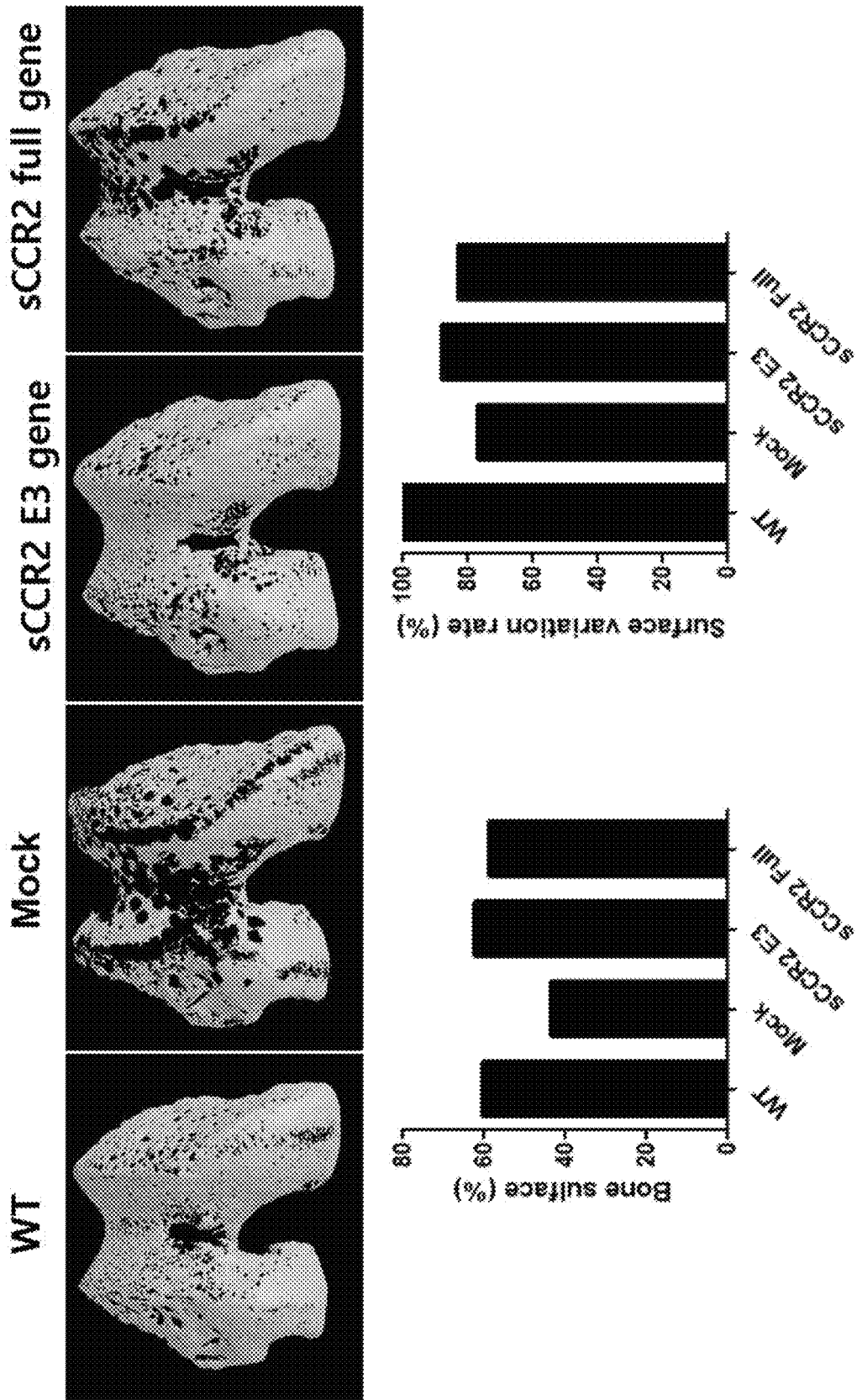
FIG. 10 shows the results of micro CT analysis after overexpression of sCCR2 in the osteoarthritis-animal model.

The present inventors collected rat femur and analyzed the degree of cartilage damage through micro CT. As a result, it was confirmed that the degree of cartilage damage in the group treated with the sCCR2 or E3-Fc recombinant vector was similar to that of normal rats compared to the control group (Mock) (FIG. 10).

Therefore, it could be confirmed from the above results that when sCCR2 is overexpressed, there is a therapeutic effect on osteoarthritis.

Example 5. Inhibitory Effect on Inflammatory Cytokine Expression in Cartilage by sCCR2 Regulation The present inventors conducted an experiment to confirm the expression of IL-1β, IL-6 and MMP13 in the cartilage of an osteoarthritis animal model through immunochemical staining in order to confirm whether sCCR2 overexpression affects the expression of inflammatory cytokines.

Figure 11:
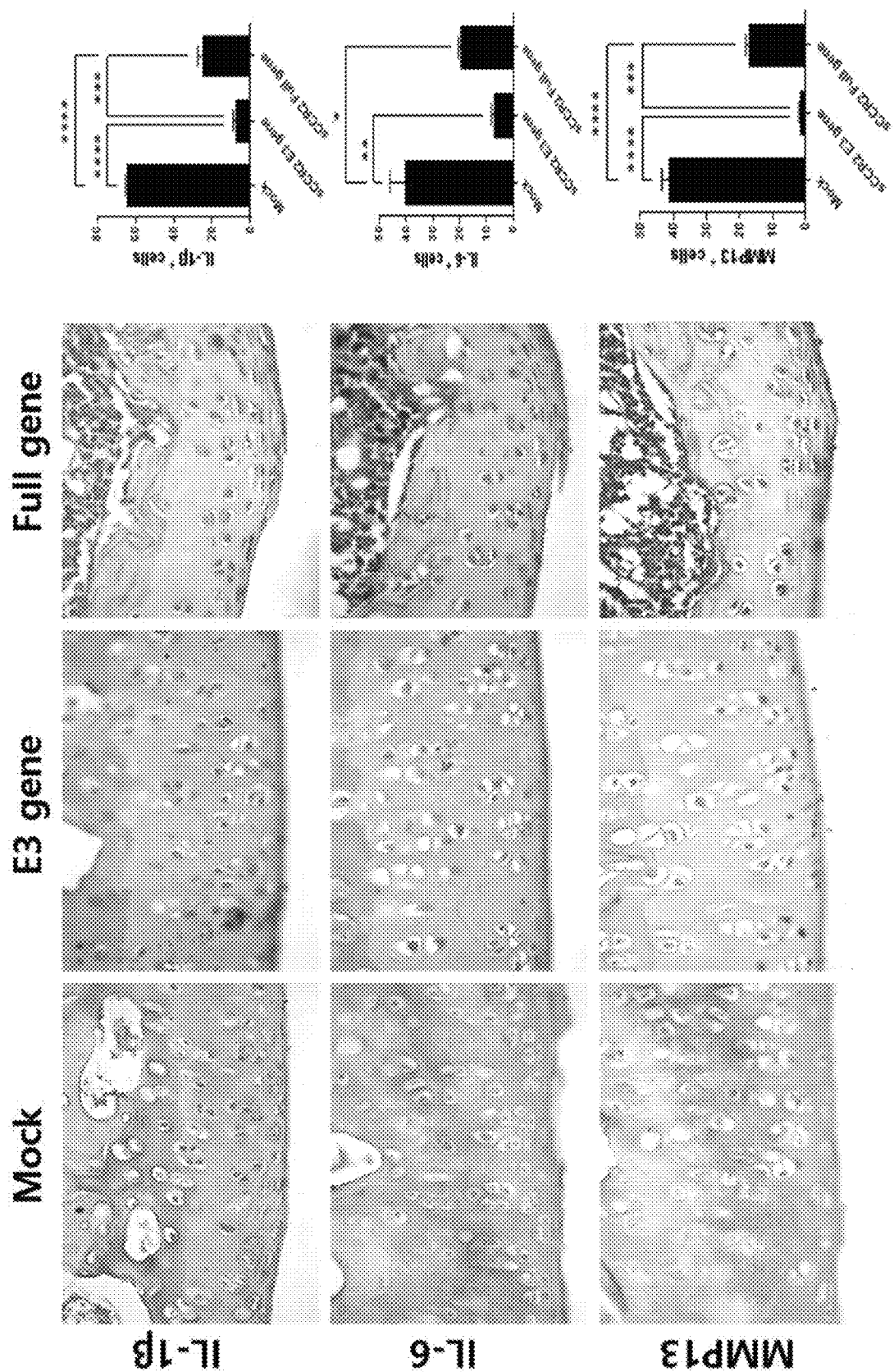
FIG. 11 shows the results of confirming the expression of IL-1β, IL-6 and MMP13 in the cartilage tissue of the osteoarthritis-animal model through immunochemical staining.

As a result, it was confirmed that IL-1β+ cells, IL-6+ cells and MMP13+ cells in the group treated with the sCCR2 or E3-Fc recombinant vector were significantly reduced compared to the control group (Mock) (FIG. 11).

Therefore, it was confirmed that sCCR2 may treat osteoarthritis by inhibiting the expression of inflammatory cytokines in cartilage.

Example 6. Mesenchymal Stem Cells Expressing sCCR2

6.1. Obtaining and Culture of Mesenchymal Stem Cells (MSCs)

The present inventors obtained mesenchymal stem cells through the following process. First, the adipose tissue obtained after surgical operation in osteoarthritis patients was washed with PBS containing 10% penicillin-streptomycin 10 times or more to remove the blood and foreign substances, and then the tissue was finley cut into 0.2 g to 0.3 g. It was put into a 0.1% collagenase solution (Roche, Sandhofer Strasse, Mannheim, Germany) and reacted at 37° C. and 100 rpm for 1 hour. After separating the solution layer decomposed by collagenase and the fragments that were not decomposed by using a 100 μm mesh, the same amount of PBS was added to the separated collagenase solution. Then, centrifugation was performed at 4° C. and 1200 rpm for 5 minutes to remove the supernatant lipid and fat layer, and then remove the collagenase supernatant. The obtained mesenchymal stem cells were inoculated into a culture dish. The culture was performed with MEM (Dulbecco's modified Eagle's medium) containing fetal intermediate bovine serum in a 37° C. at 5% and $CO_2$ incubator, changing the culture solution once every 3 days.

6.2. Preparation and Characterization of Mesenchymal Stem Cells Expressing sCCR2

The present inventors used X-tremeGENE™ HP DNA Transfection Reagent (Roche) to prepare mesenchymal stem cells expressing sCCR2 (E3-Fc). The sCCR2 or E3-Fc recombinant vector was introduced into mesenchymal stem cells in the principle of enclosing them with the liposome and allowing it to enter the biological membrane.

For mesenchymal stem cells expressing sCCR2, an experiment was performed to characterize the cells using markers (CD29, CD44, CD105, CD31, CD34, and human leukocyte antigen—antigen D related (HLA-DR)).

Figure 12A:
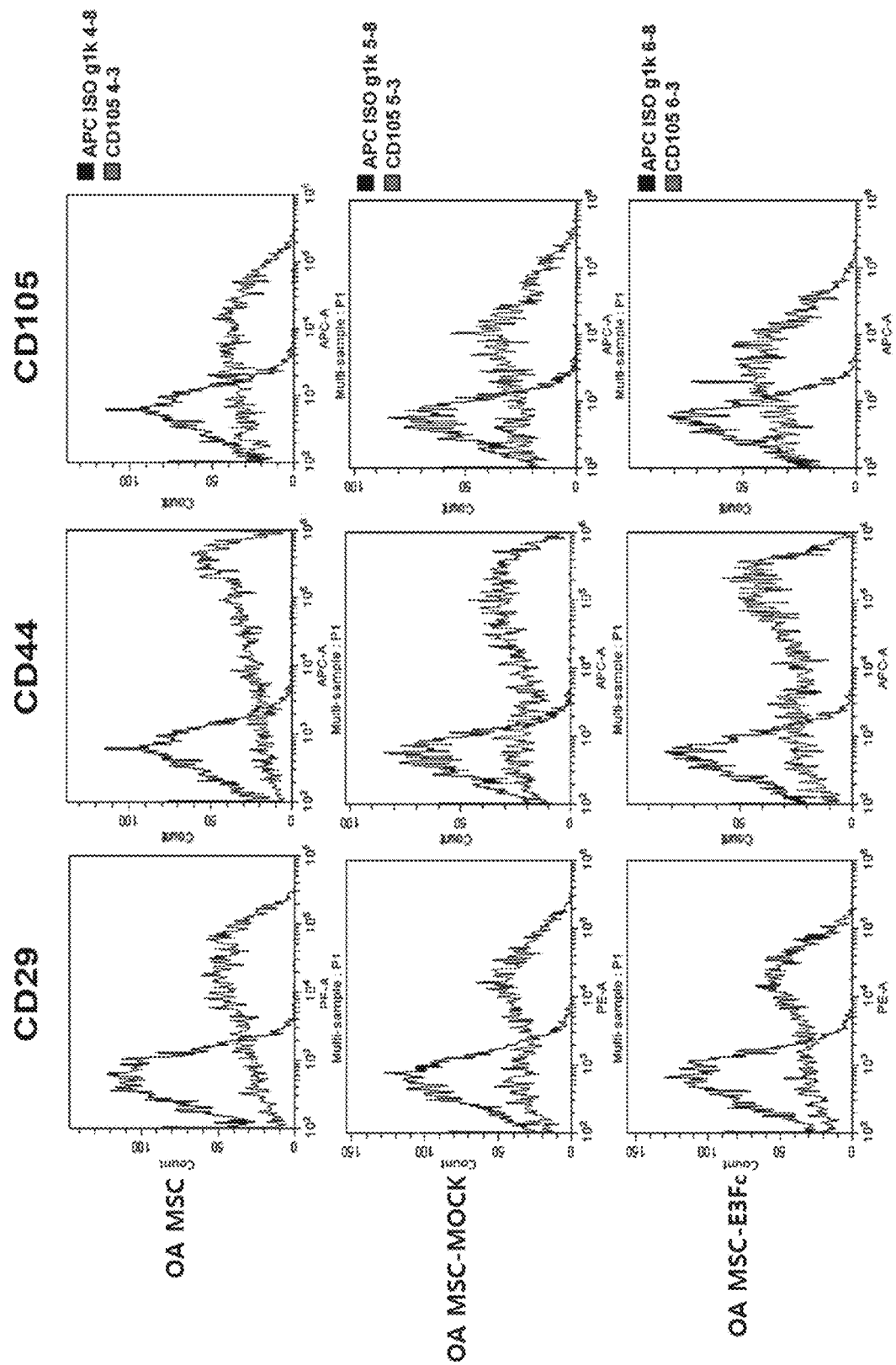

As a result, in the case of mesenchymal stem cells expressing sCCR2 (E3-Fc), CD29, CD44, and CD105 were positive, and CD31, CD34, and human leukocyte antigen—antigen D related (HLA-DR) were negative immunological characteristics. (FIGS. 12A and 12B).

Example 7. Therapeutic Effect on Osteoarthritis by Mesenchymal Stem Cells Expressing sCCR2

7.1. Pain Analysis by Mesenchymal Stem Cells Expressing sCCR2

The present inventors tested the pain relief effect on osteoarthritis in animal models of osteoarthritis in order to confirm that mesenchymal stem cells expressing sCCR2 (E3-Fc) are effective in the treatment of osteoarthritis. The osteoarthritis animal model is the same as in Example 4.1.

Mesenchymal stem cells into which sCCR2 (E3-Fc) was introduced (3×10⁵ cells) were injected into an osteoarthritis animal model by intravenous injection, and a group injected with mesenchymal stem cells not introduced with sCCR2 (E3-Fc), a group injected with Celecoxib (80 mg/kg), and a group not injected with anything were used as controls. Pain analysis was performed as in example 4.2.

Figure 13:
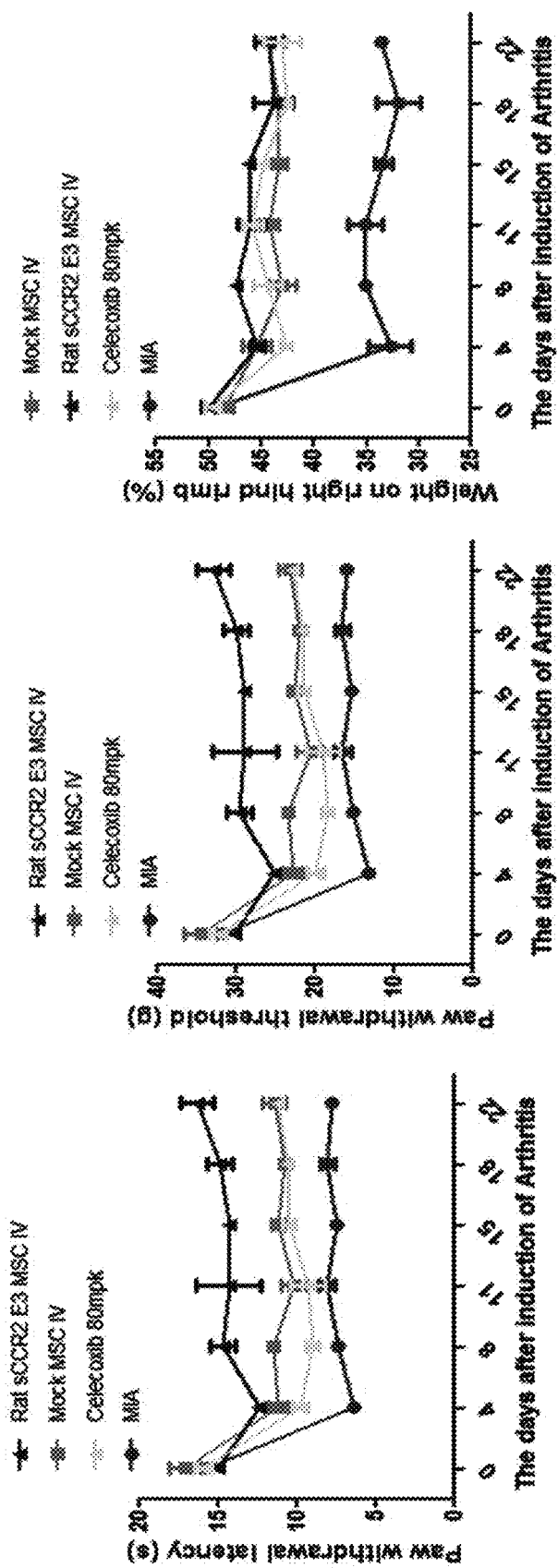
FIG. 13 shows the results of paw withdrawal latency (seconds), paw withdrawal threshold (g), and weight measurement of the right hind limb after injecting mesenchymal stem cells expressing sCCR2 into the osteoarthritis-animal model.

As a result, it was confirmed that the pain response in the group injected with mesenchymal stem cells in which sCCR2 (E3-Fc) was introduced and expressed was almost the same as that of the non-osteoarthritis-inducing state compared to the control group from 8 days after osteoarthritis induction (FIG. 13). That is, it was confirmed that after 8 days after osteoarthritis induction, the pain response level was recovered almost the same as normal.

Therefore, it was confirmed that the injection of mesenchymal stem cells expressing sCCR2 (E3-Fc) has a therapeutic effect on osteoarthritis.

7.2. Confirmation of MCP-1 Neutralization by Mesenchymal Stem Cells Expressing sCCR2

An experiment was performed to determine whether the expression of MCP-1 in mesenchymal stem cells expressing sCCR2 (E3-Fc) is decreased compared to MOCK. The above experiment was performed through a known ELISA and was performed using cells of two patients (P1 and P2) under the same conditions. As a result, it was confirmed that the expression of MCP-1 was significantly reduced in the mesenchymal stem cells expressing sCCR2 (E3-Fc) compared to the control groups (FIG. 18).

7.3. Confirmation of Cartilage Differentiation and Metabolic Factor Control of Mesenchymal Stem Cells Expressing sCCR2

An experiment was performed to determine whether there is a change in the expression level of the mesenchymal stem cells expressing sCCR2 (E3-Fc). The above experiment was performed by the known real-time-PCR method, and the primer sequences are shown in Table 1.

Figure 19:
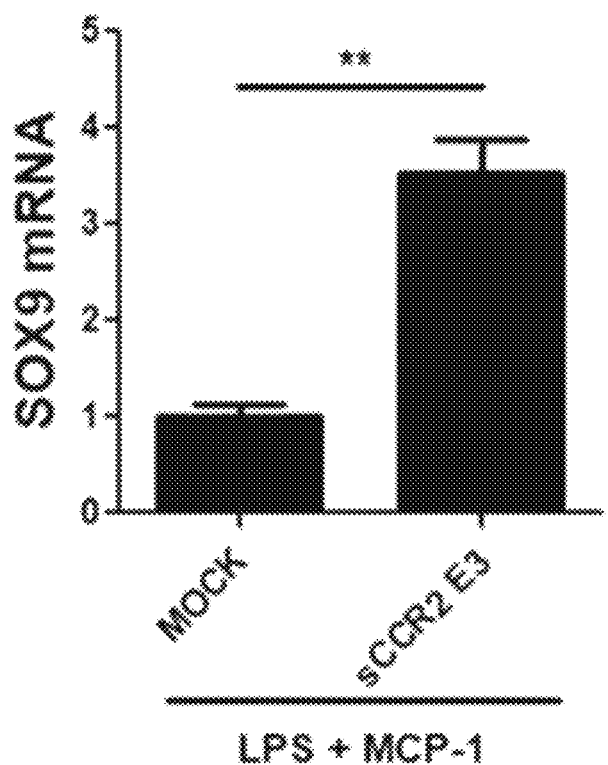
FIG. 19 shows an increase in SOX9 mRNA expression after injection of mesenchymal stem cells expressing sCCR2 (E3-Fc) into the osteoarthritis-animal model.
Figure 20:
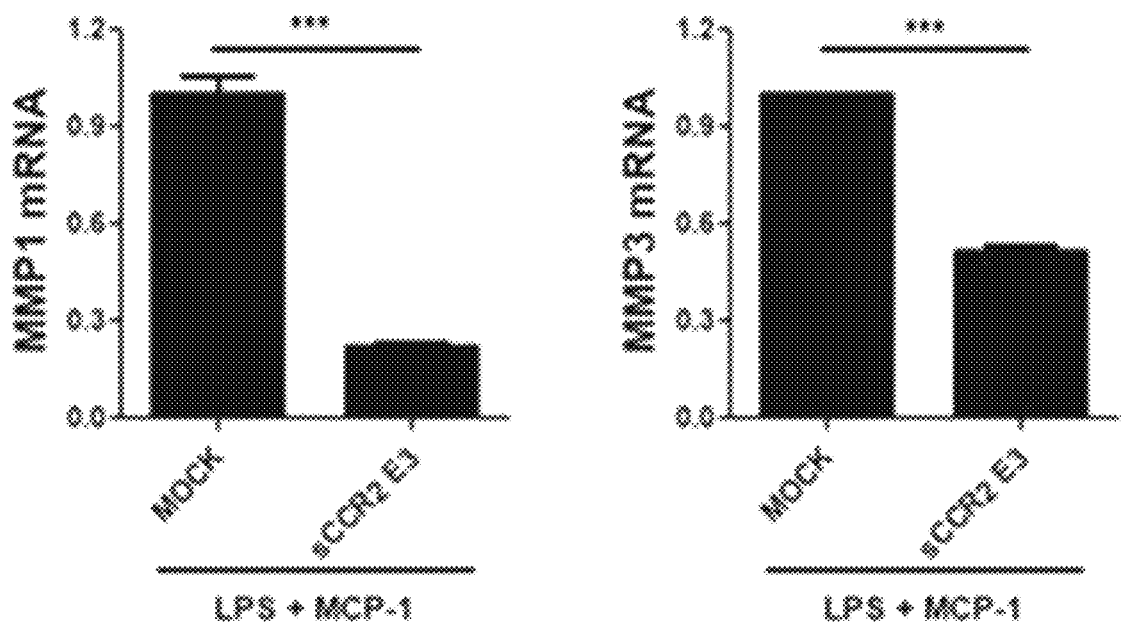
FIG. 20 shows inhibition of MMP1 and MMP3 expression after injection of mesenchymal stem cells expressing sCCR2 (E3-Fc) into the osteoarthritis-animal model.

As a result, the mRNA expression level of the SOX9 gene related to the differentiation of chondrocytes was significantly increased in the sCCR2 (E3-Fc)-expressing mesenchymal stem cells than in the control group (Mock) (FIG. 19). It was confirmed that the expression levels of mRNA genes of matrix metalloproteinase 1 (MMP1) and matrix metalloproteinase 3 (MMP3), known as collagenase, were significantly reduced (FIG. 20).

7.4. Confirmation of Anti-Inflammatory Cytokine Expression in Mesenchymal Stem Cells Expressing sCCR2

An experiment was performed to determine whether the expression of anti-inflammatory cytokines TGF-β and IL-10 increases in mesenchymal stem cells expressing sCCR2 (E3-Fc). The experiment was performed through a known ELISA.

Figure 21:
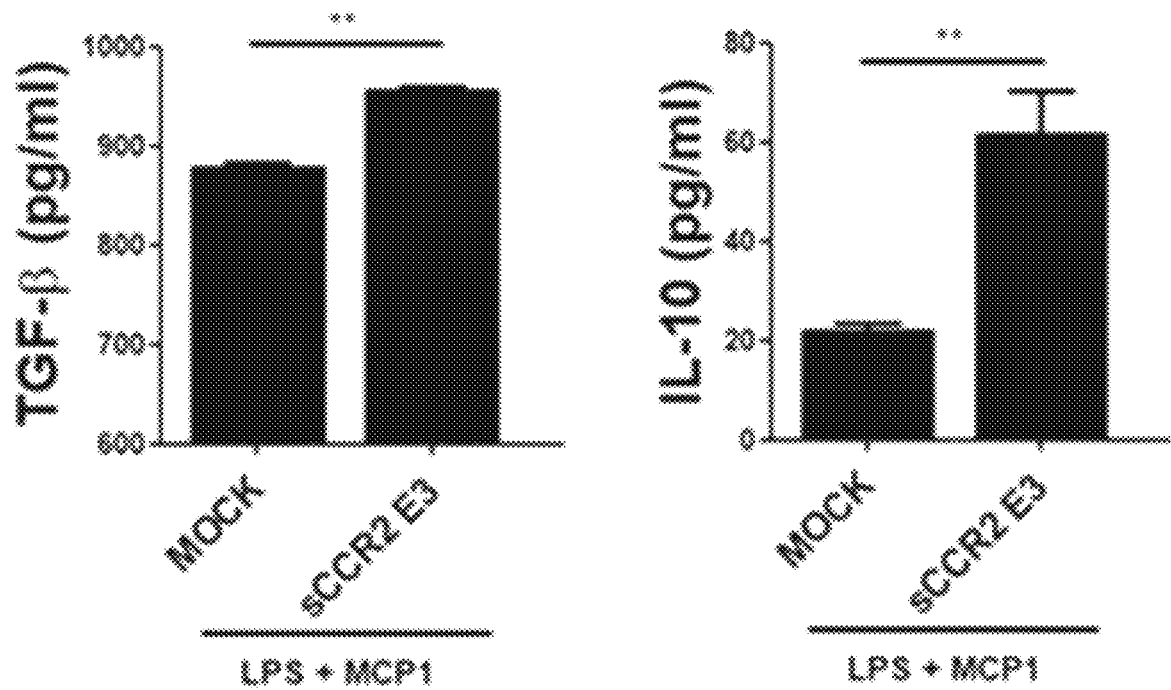
FIG. 21 shows an increase in the secretion of anti-inflammatory cytokines after injection of mesenchymal stem cells expressing sCCR2 (E3-Fc) into the osteoarthritis-animal model.

As a result, it was confirmed that the expression of TGF-β and IL-10 was significantly increased in mesenchymal stem cells expressing sCCR2 compared to the control (Mock), and in particular, the expression of IL-10 was significantly increased (FIG. 21).

7.5. Confirmation of Collagen Epitope Expression in Mesenchymal Stem Cells Expressing sCCR2

Collagen epitope CTX-II is a factor which is increased as collagen type II is decomposed when the cartilage is damaged. The present invention attempted to confirm the change in the expression of CTX-II, a collagen epitope, in serum when chondrocytes in an osteoarthritis animal model were treated with mesenchymal stem cells expressing sCCR2 (E3-Fc).

Figure 22:
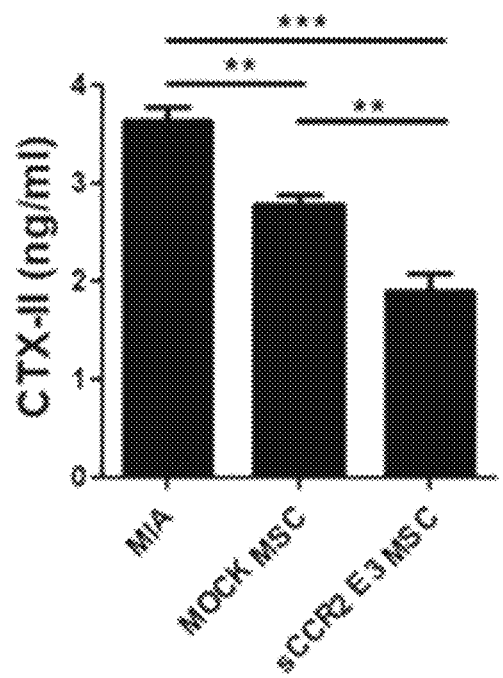
FIG. 22 shows a decrease in CTX-II expression level after injection of mesenchymal stem cells expressing sCCR2 (E3-Fc) into the osteoarthritis-animal model.

As a result, it was confirmed that the expression of CTX-II was significantly reduced in the osteoarthritis animal model (MIA) when treated with sCCR2 (E3-Fc)-expressing mesenchymal stem cells compared to the control group (Mock MSC) (FIG. 22).

The invention claimed is:

1. A recombinant polypeptide in which the E3 domain of a C—C chemokine receptor type 2 (CCR2) and an Fc fragment are fused, wherein the recombinant polypeptide comprises the amino acid sequence of SEQ ID NO: 5.

2. A recombinant vector comprising a polynucleotide sequence encoding the polypeptide of claim 1.

3. The recombinant vector of claim 2, wherein the polynucleotide sequence comprises the nucleotide sequence of SEQ ID NO: 6.

4. A method for treating osteoarthritis comprising administering to a subject in need thereof a composition comprising the recombinant polypeptide of claim 1.

* * * * *

SEQUENCE LISTING

```
<160> NUMBER OF SEQ ID NOS: 10

<210> SEQ ID NO 1
<211> LENGTH: 375
<212> TYPE: PRT
<213> ORGANISM: Artificial Sequence
<220> FEATURE:
<223> OTHER INFORMATION: rat CCR2

<400> SEQUENCE: 1

Met Glu Asp Ser Asn Met Leu Pro Gln Phe Ile His Gly Ile Leu Ser
1               5                   10                  15

Thr Ser His Ser Leu Phe Pro Arg Ser Ile Gln Glu Leu Asp Glu Gly
            20                  25                  30

Ala Thr Thr Pro Tyr Asp Tyr Asp Asp Gly Glu Pro Cys His Lys Thr
        35                  40                  45

Ser Val Lys Gln Ile Gly Ala Trp Ile Leu Pro Pro Leu Tyr Ser Leu
    50                  55                  60

Val Phe Ile Phe Gly Phe Val Gly Asn Met Leu Val Ile Ile Ile Leu
65                  70                  75                  80

Ile Ser Cys Lys Lys Leu Lys Ser Met Thr Asp Ile Tyr Leu Phe Asn
                85                  90                  95

Leu Ala Ile Ser Asp Leu Leu Phe Leu Leu Thr Leu Pro Phe Trp Ala
```

```
                    100                 105                 110
His Tyr Ala Ala Asn Glu Trp Val Phe Gly Asn Ile Met Cys Lys Leu
            115                 120                 125

Phe Thr Gly Leu Tyr His Ile Gly Tyr Phe Gly Ile Phe Phe Ile
    130                 135                 140

Ile Leu Leu Thr Ile Asp Arg Tyr Leu Ala Ile Val His Ala Val Phe
145                 150                 155                 160

Ala Leu Lys Ala Arg Thr Val Thr Phe Gly Val Ile Thr Ser Val Val
                165                 170                 175

Thr Trp Val Val Ala Val Phe Ala Ser Leu Pro Gly Ile Ile Phe Thr
            180                 185                 190

Lys Ser Glu Gln Glu Asp Asp Gln His Thr Cys Gly Pro Tyr Phe Pro
        195                 200                 205

Thr Ile Trp Lys Asn Phe Gln Thr Ile Met Arg Asn Ile Leu Ser Leu
        210                 215                 220

Ile Leu Pro Leu Leu Val Met Val Ile Cys Tyr Ser Gly Ile Leu His
225                 230                 235                 240

Thr Leu Phe Arg Cys Arg Asn Glu Lys Lys Arg His Arg Ala Val Arg
                245                 250                 255

Leu Ile Phe Ala Ile Met Ile Val Tyr Phe Leu Phe Trp Thr Pro Tyr
            260                 265                 270

Asn Ile Val Leu Phe Leu Thr Thr Phe Gln Glu Phe Leu Gly Met Ser
        275                 280                 285

Asn Cys Val Val Asp Met His Leu Asp Gln Ala Met Gln Val Thr Glu
        290                 295                 300

Thr Leu Gly Met Thr His Cys Cys Val Asn Pro Ile Ile Tyr Ala Phe
305                 310                 315                 320

Val Gly Glu Lys Phe Arg Arg Tyr Leu Ser Ile Phe Phe Arg Lys His
                325                 330                 335

Ile Ala Lys Asn Leu Cys Lys Gln Cys Pro Val Phe Tyr Arg Glu Thr
            340                 345                 350

Ala Asp Arg Val Ser Ser Thr Phe Thr Pro Ser Thr Gly Glu Gln Glu
        355                 360                 365

Val Ser Val Gly Leu Leu Gln
        370                 375

<210> SEQ ID NO 2
<211> LENGTH: 1125
<212> TYPE: DNA
<213> ORGANISM: Artificial Sequence
<220> FEATURE:
<223> OTHER INFORMATION: rat CCR2

<400> SEQUENCE: 2
atggaagaca gtaatatgtt acctcagttc atccatggca tactatcaac atctcattct        60
ctatttccaa gaagtatcca agagcttgat gaggggggcca ccacaccgta tgactatgat      120
gatggtgaac cttgtcataa aaccagtgtg aagcaaattg gagcttggat cctgccccca      180
ctctactccc tggtattcat ctttggtttt gtgggcaaca tgttggtcat tataattctg      240
ataagctgta aaaagctgaa gagcatgact gatatctacc tgttcaacct ggccatctct      300
gacctgctct tcctgctcac actcccattc tgggctcact atgctgcaaa tgagtgggtc      360
tttgggaata taatgtgcaa attattcaca gggctttatc acattgggta ttttggtgga      420
atcttcttca ttatcctcct gacaattgat agatatttgg ctattgtcca tgctgtcttt      480
```

-continued

```
gctttaaaag ccaggacagt tacctttggg gtaataacaa gtgtagtcac ttgggtggtg      540
gctgtgtttg cctctctacc aggaatcata tttactaaat ctgaacaaga agatgatcag      600
catacttgtg gcccttattt tccaacaatc tggaagaatt tccaaacaat aatgaggaat      660
atcttgagtt tgatcctgcc cctacttgtc atggtcatct gctactcagg aatcctccac      720
accctgtttc gctgtaggaa tgagaaaaag aggcataggg ctgtgaggct catctttgcc      780
atcatgattg tctactttct cttctggact ccatacaata ttgttctctt cctgaccacc      840
ttccaggaat tcttgggaat gagtaactgt gtggttgaca tgcacttaga ccaggccatg      900
caggtgacag agactcttgg aatgacacac tgctgcgtta atcctatcat ttatgccttt      960
gttggtgaga agttccgaag gtatctctcc atattttttca gaaagcacat tgccaaaaat     1020
ctctgcaaac aatgcccagt tttctatagg gagacagcag accgagtgag ctcaacattt     1080
accccttcta ctggggagca agaagtctca gttgggttgc tgcag                     1125
```

<210> SEQ ID NO 3
<211> LENGTH: 21
<212> TYPE: PRT
<213> ORGANISM: Artificial Sequence
<220> FEATURE:
<223> OTHER INFORMATION: rat CCR2 E3 amino acid

<400> SEQUENCE: 3

```
Thr Thr Phe Gln Glu Phe Leu Gly Met Ser Asn Cys Val Val Asp Met
1               5                   10                  15

His Leu Asp Gln Ala
            20
```

<210> SEQ ID NO 4
<211> LENGTH: 63
<212> TYPE: DNA
<213> ORGANISM: Artificial Sequence
<220> FEATURE:
<223> OTHER INFORMATION: rat CCR2 E3 nucleic acid

<400> SEQUENCE: 4

```
accaccttcc aggaattctt gggaatgagt aactgtgtgg ttgacatgca cttagaccag       60
gcc                                                                    63
```

<210> SEQ ID NO 5
<211> LENGTH: 255
<212> TYPE: PRT
<213> ORGANISM: Artificial Sequence
<220> FEATURE:
<223> OTHER INFORMATION: rat CCR2 E3-Fc amino acid

<400> SEQUENCE: 5

```
Thr Thr Phe Gln Glu Phe Leu Gly Met Ser Asn Cys Val Val Asp Met
1               5                   10                  15

His Leu Asp Gln Ala Leu Gln Glu Pro Lys Ser Cys Asp Lys Thr His
            20                  25                  30

Thr Cys Pro Pro Cys Pro Ala Pro Glu Leu Leu Gly Gly Pro Ser Val
        35                  40                  45

Phe Leu Phe Pro Pro Lys Pro Lys Asp Thr Leu Met Ile Ser Arg Thr
    50                  55                  60

Pro Glu Val Thr Cys Val Val Val Asp Val Ser His Glu Asp Pro Glu
65                  70                  75                  80

Val Lys Phe Asn Trp Tyr Val Asp Gly Val Glu Val His Asn Ala Lys
                85                  90                  95
```

```
Thr Lys Pro Arg Glu Glu Gln Tyr Asn Ser Thr Tyr Arg Val Val Ser
            100                 105                 110

Val Leu Thr Val Leu His Gln Asp Trp Leu Asn Gly Lys Glu Tyr Lys
        115                 120                 125

Cys Lys Val Ser Asn Lys Ala Leu Pro Ala Pro Ile Glu Lys Thr Ile
    130                 135                 140

Ser Lys Ala Lys Gly Gln Pro Arg Glu Pro Gln Val Tyr Thr Leu Pro
145                 150                 155                 160

Pro Ser Arg Asp Glu Leu Thr Lys Asn Gln Val Ser Leu Thr Cys Leu
                165                 170                 175

Val Lys Gly Phe Tyr Pro Ser Asp Ile Ala Val Glu Trp Glu Ser Asn
            180                 185                 190

Gly Gln Pro Glu Asn Asn Tyr Lys Thr Thr Pro Pro Val Leu Asp Ser
        195                 200                 205

Asp Gly Ser Phe Phe Leu Tyr Ser Lys Leu Thr Val Asp Lys Ser Arg
    210                 215                 220

Trp Gln Gln Gly Asn Val Phe Ser Cys Ser Val Met His Glu Ala Leu
225                 230                 235                 240

His Asn His Tyr Thr Gln Lys Ser Leu Ser Leu Ser Pro Gly Lys
                245                 250                 255
```

<210> SEQ ID NO 6
<211> LENGTH: 765
<212> TYPE: DNA
<213> ORGANISM: Artificial Sequence
<220> FEATURE:
<223> OTHER INFORMATION: rat CCR2 E3-Fc nucleic acid

<400> SEQUENCE: 6

```
accaccttcc aggaattctt gggaatgagt aactgtgtgg ttgacatgca cttagaccag      60
gccctgcagg aacccaagag ttgcgataaa cccatacat gcccccttg tcctgcccca      120
gaactcctgg ggggtccaag cgtgttcctc tttccaccca agcccaaaga cactctgatg      180
atctcacgga ctcccgaggt gacctgcgtg gtcgtggacg tgagccacga ggatcctgaa      240
gtgaagttca ctggtacgt ggatggagtc gaggtgcata atgccaagac caaaccaaga      300
gaggaacagt acaacagtac ttatcgggtc gtgtcagtgc tcaccgtcct gcaccaggac      360
tggctgaacg gaaaggagta taagtgcaaa gtgtccaata aggcactgcc cgcccctatc      420
gagaaaacca tttctaaggc aaaagggcag cctagagaac acaggtgta cacactccct      480
ccaagccggg acgagctgac caagaaccag gtgtccctca catgtctggt caaaggcttc      540
tatccttccg atatcgctgt ggagtgggaa tctaatggac agccagagaa caattacaag      600
actaccccc ctgtgctgga ctcagatggg agcttctttc tctattctaa gctgaccgtg      660
gacaaaagta gatggcagca gggtaacgtg ttcagctgct cagtcatgca tgaggccctg      720
cataatcact acacccagaa atcactgtca ctcagcccag gaaaa             765
```

<210> SEQ ID NO 7
<211> LENGTH: 441
<212> TYPE: PRT
<213> ORGANISM: Artificial Sequence
<220> FEATURE:
<223> OTHER INFORMATION: pSecTag2-rat CCR2

<400> SEQUENCE: 7

```
Met Glu Thr Asp Thr Leu Leu Leu Trp Val Leu Leu Trp Val Pro Gly
1               5                   10                  15
```

```
Ser Thr Gly Asp Ala Ala Gln Pro Ala Arg Ala Arg Arg Thr Lys
            20                  25                  30

Leu Met Glu Asp Ser Asn Met Leu Pro Gln Phe Ile His Gly Ile Leu
        35                  40                  45

Ser Thr Ser His Ser Leu Phe Pro Arg Ser Ile Gln Glu Leu Asp Glu
        50                  55                  60

Gly Ala Thr Thr Pro Tyr Asp Tyr Asp Asp Gly Glu Pro Cys His Lys
65                  70                  75                  80

Thr Ser Val Lys Gln Ile Gly Ala Trp Ile Leu Pro Pro Leu Tyr Ser
                85                  90                  95

Leu Val Phe Ile Phe Gly Phe Val Gly Asn Met Leu Val Ile Ile Ile
                100                 105                 110

Leu Ile Ser Cys Lys Lys Leu Lys Ser Met Thr Asp Ile Tyr Leu Phe
            115                 120                 125

Asn Leu Ala Ile Ser Asp Leu Leu Phe Leu Leu Thr Leu Pro Phe Trp
130                 135                 140

Ala His Tyr Ala Ala Asn Glu Trp Val Phe Gly Asn Ile Met Cys Lys
145                 150                 155                 160

Leu Phe Thr Gly Leu Tyr His Ile Gly Tyr Phe Gly Gly Ile Phe Phe
                165                 170                 175

Ile Ile Leu Leu Thr Ile Asp Arg Tyr Leu Ala Ile Val His Ala Val
                180                 185                 190

Phe Ala Leu Lys Ala Arg Thr Val Thr Phe Gly Val Ile Thr Ser Val
                195                 200                 205

Val Thr Trp Val Val Ala Val Phe Ala Ser Leu Pro Gly Ile Ile Phe
        210                 215                 220

Thr Lys Ser Glu Gln Glu Asp Asp Gln His Thr Cys Gly Pro Tyr Phe
225                 230                 235                 240

Pro Thr Ile Trp Lys Asn Phe Gln Thr Ile Met Arg Asn Ile Leu Ser
                245                 250                 255

Leu Ile Leu Pro Leu Leu Val Met Val Ile Cys Tyr Ser Gly Ile Leu
                260                 265                 270

His Thr Leu Phe Arg Cys Arg Asn Glu Lys Lys Arg His Arg Ala Val
        275                 280                 285

Arg Leu Ile Phe Ala Ile Met Ile Val Tyr Phe Leu Phe Trp Thr Pro
290                 295                 300

Tyr Asn Ile Val Leu Phe Leu Thr Thr Phe Gln Glu Phe Leu Gly Met
305                 310                 315                 320

Ser Asn Cys Val Val Asp Met His Leu Asp Gln Ala Met Gln Val Thr
                325                 330                 335

Glu Thr Leu Gly Met Thr His Cys Cys Val Asn Pro Ile Ile Tyr Ala
                340                 345                 350

Phe Val Gly Glu Lys Phe Arg Arg Tyr Leu Ser Ile Phe Phe Arg Lys
                355                 360                 365

His Ile Ala Lys Asn Leu Cys Lys Gln Cys Pro Val Phe Tyr Arg Glu
        370                 375                 380

Thr Ala Asp Arg Val Ser Ser Thr Phe Thr Pro Ser Thr Gly Glu Gln
385                 390                 395                 400

Glu Val Ser Val Gly Leu Leu Gln Ile Ser Thr Val Ala Ala Ala
                405                 410                 415

Arg Gly Gly Pro Glu Gln Lys Leu Ile Ser Glu Glu Asp Leu Asn Ser
                420                 425                 430
```

Ala Val Asp His His His His His
            435                 440

<210> SEQ ID NO 8
<211> LENGTH: 314
<212> TYPE: PRT
<213> ORGANISM: Artificial Sequence
<220> FEATURE:
<223> OTHER INFORMATION: pSecTag2-rat CCR2E3-FC

<400> SEQUENCE: 8

Met Glu Thr Asp Thr Leu Leu Leu Trp Val Leu Leu Trp Val Pro
1               5                   10                  15

Gly Ser Thr Gly Asp Ala Ala Gln Pro Ala Arg Arg Ala Val Arg Ser
                20                  25                  30

Leu Thr Thr Phe Gln Glu Phe Leu Gly Met Ser Asn Cys Val Val Asp
                35                  40                  45

Met His Leu Asp Gln Ala Leu Gln Glu Pro Lys Ser Cys Asp Lys Thr
        50                  55                  60

His Thr Cys Pro Pro Cys Pro Ala Pro Glu Leu Leu Gly Gly Pro Ser
65                  70                  75                  80

Val Phe Leu Phe Pro Pro Lys Pro Lys Asp Thr Leu Met Ile Ser Arg
                85                  90                  95

Thr Pro Glu Val Thr Cys Val Val Val Asp Val Ser His Glu Asp Pro
            100                 105                 110

Glu Val Lys Phe Asn Trp Tyr Val Asp Gly Val Glu Val His Asn Ala
            115                 120                 125

Lys Thr Lys Pro Arg Glu Glu Gln Tyr Asn Ser Thr Tyr Arg Val Val
        130                 135                 140

Ser Val Leu Thr Val Leu His Gln Asp Trp Leu Asn Gly Lys Glu Tyr
145                 150                 155                 160

Lys Cys Lys Val Ser Asn Lys Ala Leu Pro Ala Pro Ile Glu Lys Thr
                165                 170                 175

Ile Ser Lys Ala Lys Gly Gln Pro Arg Glu Pro Gln Val Tyr Thr Leu
            180                 185                 190

Pro Pro Ser Arg Asp Glu Leu Thr Lys Asn Gln Val Ser Leu Thr Cys
        195                 200                 205

Leu Val Lys Gly Phe Tyr Pro Ser Asp Ile Ala Val Glu Trp Glu Ser
210                 215                 220

Asn Gly Gln Pro Glu Asn Asn Tyr Lys Thr Thr Pro Pro Val Leu Asp
225                 230                 235                 240

Ser Asp Gly Ser Phe Phe Leu Tyr Ser Lys Leu Thr Val Asp Lys Ser
                245                 250                 255

Arg Trp Gln Gln Gly Asn Val Phe Ser Cys Ser Val Met His Glu Ala
            260                 265                 270

Leu His Asn His Tyr Thr Gln Lys Ser Leu Ser Leu Ser Pro Gly Lys
        275                 280                 285

Pro Arg Gly Gly Pro Glu Gln Lys Leu Ile Ser Glu Glu Asp Leu Asn
        290                 295                 300

Ser Ala Val Asp His His His His His
305                 310

<210> SEQ ID NO 9
<211> LENGTH: 1326
<212> TYPE: DNA
<213> ORGANISM: Artificial Sequence
<220> FEATURE:

<223> OTHER INFORMATION: pSecTag2-rat CCR2 nucleic acid

<400> SEQUENCE: 9

| | |
|---|---|
| atggagacag acacactcct gctatgggta ctgctctggg ttccaggttc cactggtgac | 60 |
| gcggcccagc cggccaggcg cgcgcgccgt acgaagctta tggaagacag taatatgtta | 120 |
| cctcagttca tccatggcat actatcaaca tctcattctc tatttccaag aagtatccaa | 180 |
| gagcttgatg aggggccac cacaccgtat gactatgatg atggtgaacc ttgtcataaa | 240 |
| accagtgtga agcaaattgg agcttggatc ctgcccccac tctactccct ggtattcatc | 300 |
| tttggttttg tgggcaacat gttggtcatt ataattctga taagctgtaa aaagctgaag | 360 |
| agcatgactg atatctacct gttcaacctg gccatctctg acctgctctt cctgctcaca | 420 |
| ctcccattct gggctcacta tgctgcaaat gagtgggtct ttgggaatat aatgtgcaaa | 480 |
| ttattcacag ggctttatca cattgggtat tttggtggaa tcttcttcat tatcctcctg | 540 |
| acaattgata gatatttggc tattgtccat gctgtctttg ctttaaaagc caggacagtt | 600 |
| acctttgggg taataacaag tgtagtcact tgggtggtgg ctgtgtttgc ctctctacca | 660 |
| ggaatcatat ttactaaatc tgaacaagaa gatgatcagc atacttgtgg cccttatttt | 720 |
| ccaacaatct ggaagaattt ccaaacaata tgaggaata tcttgagttt gatcctgccc | 780 |
| ctacttgtca tggtcatctg ctactcagga atcctccaca ccctgtttcg ctgtaggaat | 840 |
| gagaaaaaga ggcataggc tgtgaggctc atctttgcca tcatgattgt ctactttctc | 900 |
| ttctggactc catacaatat tgttctcttc ctgaccacct tccaggaatt cttgggaatg | 960 |
| agtaactgtg tggttgacat gcacttagac caggccatgc aggtgacaga gactcttgga | 1020 |
| atgacacact gctgcgttaa tcctatcatt tatgcctttg ttggtgagaa gttccgaagg | 1080 |
| tatctctcca tattttcag aaagcacatt gccaaaaatc tctgcaaaca atgcccagtt | 1140 |
| ttctataggg agacagcaga ccgagtgagc tcaacattta ccccttctac tggggagcaa | 1200 |
| gaagtctcag ttgggttgct gcagatatcc agcacagtgg cggccgctcg aggagggccc | 1260 |
| gaacaaaaac tcatctcaga agaggatctg aatagcgccg tcgaccatca tcatcatcat | 1320 |
| cattga | 1326 |

<210> SEQ ID NO 10
<211> LENGTH: 945
<212> TYPE: DNA
<213> ORGANISM: Artificial Sequence
<220> FEATURE:
<223> OTHER INFORMATION: pSecTag2-rat CCR2E3-FC nucleic acid

<400> SEQUENCE: 10

| | |
|---|---|
| atggagacag acacactcct gctatgggta ctgctgctct gggttccagg ttcactggt | 60 |
| gacgcggccc agccggccag gcgcgccgta cgaagcttga ccaccttcca ggaattcttg | 120 |
| ggaatgagta actgtgtggt tgacatgcac ttagaccagg ccctgcagga acccaagagt | 180 |
| tgcgataaaa cccatacatg ccccccttgt cctgccccag aactcctggg gggtccaagc | 240 |
| gtgttcctct ttccacccaa gcccaaagac actctgatga tctcacggac tcccgaggtg | 300 |
| acctgcgtgg tcgtggacgt gagccacgag gatcctgaag tgaagttcaa ctggtacgtg | 360 |
| gatggagtcg aggtgcataa tgccaagacc aaaccaagag aggaacagta caacagtact | 420 |
| tatcgggtcg tgtcagtgct caccgtcctg caccaggact ggctgaacgg aaaggagtat | 480 |
| aagtgcaaag tgtccaataa ggcactgccc gcccctatcg agaaaaccat ttctaaggca | 540 |
| aaagggcagc ctagagaacc acaggtgtac acactccctc aagccgggga cgagctgacc | 600 |

```
aagaaccagg tgtccctcac atgtctggtc aaaggcttct atccttccga tatcgctgtg    660
gagtgggaat ctaatggaca gccagagaac aattacaaga ctacccccc  tgtgctggac    720 tcagatggga gcttctttct ctattctaag ctgaccgtgg acaaaagtag atggcagcag    780
ggtaacgtgt tcagctgctc agtcatgcat gaggccctgc ataatcacta cacccagaaa    840
tcactgtcac tcagcccagg aaaacctcga ggagggcccg aacaaaaact catctcagaa    900
gaggatctga atagcgccgt cgaccatcat catcatcatc attga                    945
```